United States Patent
Nickerson et al.

(10) Patent No.: US 8,082,295 B2
(45) Date of Patent: Dec. 20, 2011

(54) REPORTING TO A WEBSITE OWNER ONE OR MORE APPEARANCES OF A SPECIFIED WORD IN ONE OR MORE PAGE-SPECIFIC OPEN-ENDED COMMENTS CONCERNING ONE OR MORE PARTICULAR WEB PAGES OF A WEBSITE

(75) Inventors: Rand B. Nickerson, Highland Park, IL (US); Mark A. Treschl, Highland Park, IL (US); Jay S. Rudman, Chicago, IL (US)

(73) Assignee: OpinionLab, Inc., Highland Park, IL (US)

( * ) Notice: Subject to any disclaimer, the term of this patent is extended or adjusted under 35 U.S.C. 154(b) by 441 days.

(21) Appl. No.: 12/328,733

(22) Filed: Dec. 4, 2008

(65) Prior Publication Data

US 2009/0083264 A1   Mar. 26, 2009

Related U.S. Application Data

(63) Continuation of application No. 10/210,609, filed on Jul. 31, 2002, now Pat. No. 7,478,121.

(51) Int. Cl.
    *G06F 13/00* (2006.01)
(52) U.S. Cl. ....................................... 709/203
(58) Field of Classification Search .................... 709/203
    See application file for complete search history.

(56) References Cited

U.S. PATENT DOCUMENTS

| | | |
|---|---|---|
| 5,537,618 A | 7/1996 | Boulton et al. |
| 5,568,489 A | 10/1996 | Yien et al. |
| 5,678,041 A | 10/1997 | Baker et al. |
| 5,706,507 A | 1/1998 | Schloss |
| 5,727,950 A | 3/1998 | Cook |
| 5,754,939 A | 5/1998 | Herz et al. |
| 5,761,683 A | 6/1998 | Logan et al. |
| 5,778,182 A | 7/1998 | Cathey et al. |
| 5,804,803 A | 9/1998 | Cragun et al. |
| 5,809,247 A | 9/1998 | Richardson et al. |
| 5,862,223 A | 1/1999 | Walker et al. |

(Continued)

FOREIGN PATENT DOCUMENTS

WO    WO 99/59096    11/1999

(Continued)

OTHER PUBLICATIONS 2,489,322 Canadian Patent Application, Office Action, Nov. 14, 2008.

(Continued)

*Primary Examiner* — Robert B Harrell
(74) *Attorney, Agent, or Firm* — Baker Botts L.L.P.

(57) ABSTRACT

In one embodiment, a method for reporting to a website owner one or more appearances of a specified word in one or more page-specific open-ended comments concerning one or more particular web pages of a website includes receiving one or more page-specific open-ended comments concerning one or more particular web pages of a website from users that have accessed the particular web pages, identifying, in the one or more page-specific open-ended comments concerning the one or more particular web pages of the website, each appearance of the specified word, and generating a report reflecting the identified appearances of the specified word in the one or more page-specific open-ended comments concerning the one or more particular web pages of the website.

12 Claims, 10 Drawing Sheets

U.S. PATENT DOCUMENTS

| | | | |
|---|---|---|---|
| 5,862,260 | A | 1/1999 | Rhoads |
| 5,862,325 | A | 1/1999 | Reed et al. |
| 5,870,744 | A | 2/1999 | Sprague |
| 5,872,850 | A | 2/1999 | Klein et al. |
| 5,958,008 | A | 9/1999 | Pogrebisky et al. |
| 5,973,683 | A | 10/1999 | Cragun et al. |
| 5,974,572 | A | 10/1999 | Weinberg et al. |
| 5,991,735 | A | 11/1999 | Gerace |
| 6,029,171 | A | 2/2000 | Smiga et al. |
| 6,035,330 | A | 3/2000 | Astiz et al. |
| 6,134,531 | A | 10/2000 | Trewitt et al. |
| 6,141,010 | A | 10/2000 | Hoyle |
| 6,161,112 | A | 12/2000 | Cragun et al. |
| 6,189,029 | B1 | 2/2001 | Fuerst |
| 6,236,975 | B1 | 5/2001 | Boe et al. |
| 6,243,722 | B1 | 6/2001 | Day et al. |
| 6,260,064 | B1 | 7/2001 | Kurzrok |
| 6,297,819 | B1 | 10/2001 | Furst |
| 6,385,590 | B1 | 5/2002 | Levine |
| 6,389,538 | B1 | 5/2002 | Gruse et al. |
| 6,393,479 | B1 | 5/2002 | Glommen et al. |
| 6,421,724 | B1 | 7/2002 | Nickerson et al. |
| 6,434,556 | B1 | 8/2002 | Levin et al. |
| 6,449,632 | B1 | 9/2002 | David et al. |
| 6,460,036 | B1 | 10/2002 | Herz |
| 6,477,504 | B1 | 11/2002 | Hamlin et al. |
| 6,480,852 | B1 | 11/2002 | Himmel et al. |
| 6,510,427 | B1 | 1/2003 | Bossemeyer, Jr. et al. |
| 6,578,014 | B1 | 6/2003 | Murcko, Jr. |
| 6,606,581 | B1 | 8/2003 | Nickerson et al. |
| 6,606,657 | B1 | 8/2003 | Zilberstein et al. |
| 6,606,659 | B1 | 8/2003 | Hegli et al. |
| 6,618,717 | B1 | 9/2003 | Karadimitriou et al. |
| 6,631,184 | B1 | 10/2003 | Weiner |
| 6,681,247 | B1 | 1/2004 | Payton |
| 6,748,449 | B1 | 6/2004 | Dutta |
| 6,766,481 | B2 | 7/2004 | Estep et al. |
| 6,772,139 | B1 | 8/2004 | Smith, III |
| 6,785,717 | B1 | 8/2004 | Nickerson et al. |
| 6,792,458 | B1 | 9/2004 | Muret et al. |
| 6,819,336 | B1 | 11/2004 | Nielsen |
| 6,859,784 | B1 | 2/2005 | van Duyne et al. |
| 6,895,437 | B1 | 5/2005 | Cowdrey et al. |
| 6,928,392 | B2 | 8/2005 | Nickerson et al. |
| 6,938,202 | B1 | 8/2005 | Matsubayashi et al. |
| 7,024,691 | B1 | 4/2006 | Herzberg et al. |
| 7,085,820 | B1 | 8/2006 | Nickerson et al. |
| 7,181,696 | B2 | 2/2007 | Brock |
| 7,370,285 | B1 | 5/2008 | Nickerson et al. |
| 2002/0049713 | A1 | 4/2002 | Khemlani et al. |
| 2002/0065802 | A1 | 5/2002 | Uchiyama |
| 2002/0072955 | A1 | 6/2002 | Brock |
| 2002/0087526 | A1 | 7/2002 | Rao |
| 2002/0087679 | A1 | 7/2002 | Pulley et al. |
| 2002/0087969 | A1 | 7/2002 | Brunheroto et al. |
| 2002/0099617 | A1 | 7/2002 | Fogelson |
| 2002/0111865 | A1 | 8/2002 | Middleton |
| 2002/0120727 | A1 | 8/2002 | Curley et al. |
| 2003/0009555 | A1 | 1/2003 | Nickerson et al. |
| 2003/0085927 | A1 | 5/2003 | Muller |
| 2003/0115023 | A1 | 6/2003 | Nickerson et al. |
| 2003/0207238 | A1 | 11/2003 | Latzina et al. |
| 2003/0217034 | A1 | 11/2003 | Shutt |
| 2004/0015866 | A1 | 1/2004 | Estep et al. |
| 2004/0049417 | A1 | 3/2004 | Nickerson et al. |
| 2004/0049534 | A1 | 3/2004 | Nickerson et al. |
| 2004/0049571 | A1 | 3/2004 | Johnson et al. |
| 2004/0201633 | A1 | 10/2004 | Barsness et al. |
| 2004/0205065 | A1 | 10/2004 | Petras et al. |
| 2005/0108020 | A1 | 5/2005 | Lehavi |
| 2005/0192854 | A1 | 9/2005 | Ebert et al. |
| 2005/0240618 | A1 | 10/2005 | Nickerson et al. |
| 2005/0251399 | A1 | 11/2005 | Agarwal et al. |
| 2006/0259767 | A1 | 11/2006 | Mansz et al. |

FOREIGN PATENT DOCUMENTS

| | | |
|---|---|---|
| WO | WO 00/62204 | 10/2000 |
| WO | WO 01/16841 A2 | 3/2001 |
| WO | WO 2004/012044 | 2/2004 |

OTHER PUBLICATIONS

Opinionlab, "dna," May 5, 2001, 2 pages, XP-002382097.

Opinionlab, "Web pages Retrieved on Jun. 5, 2001," www.opinionlab.com, pp. 1-70.

Opinionlab, "O-Metric Demonstration Tutorial," 6 pages, available prior to Jul. 31, 2001.

Opinionlab, "Best Practices in Collecting Web User Feedback," pp. 1-10, Apr. 2001.

Opinionlab, "Opinionlab's Audit of the Fifty Most Trafficked Websites," pp. 1-4, 2002.

Opinionlab, "Webpages," 23 pages, available prior to Jul. 31, 2001.

Opinionlab, "Brochure re: User Experience Optimization," 1 page, available prior to Jul. 31, 2011.

Opinionlab, "Brochure re: Navigating an O-Metric Report," pp. 1-3, available prior to Jul. 31, 2001.

Notification of Transmittal of the International Search Report or the Declaration (PCT Rule 44.1) and Written Opinion of the International Search Authority for International Application No. PCT/US06/18184), mailed Mar. 7, 2008, 8 pages.

European Patent Office, PCT Scarch Report, Application No. 03771825.1-2205, Patent No. PCT-US0323250, Application No. EP 03 77 1825, 3 pages, Jun. 21, 2006.

OPINIONLAB, "The Online Opinion System—different From Other Feedback Techniques, "[online], http://web.archive.org//web/200210100241033/www.opinionlab.com/different.asp>, Jul. 23, 2002, retrieved on May 22, 2006, XP002382097,2 pages.

Anonymous, OpinionLab [online], DIARIST.NET, http://www.diarist.net/active/showthread.php?t=345>, May 8, 2001, retrieved on May 22, 2006, 2 pages, XP002382095.

Graham, Jeffrey, "Alternatives to Testing User Experience," [online], Clickz.com, http://www.clickz.com/experts/brand/emkt_strat/print.php/827111, Jul. 31, 2000, retrieved on May 22, 2006, 2 pages, XP002382095.

Morgan, Bryan, "Visual J++ Unleashed," Online! SAMS.NET, Indianapolis, IND., XP022333000, Chapter 25 Browser Support for Active Content, Jun. 21, 2005.

Faison, Ted, "Component-Based Development with Visual C#," Online!, XP002333001, Chapter 8, Creating Front Ends with the Web Browser Component, pp. 1-4, 33, Feb. 2002.

Etgen, Michael et al., "What Does Getting WET (Web Event-Logging Tool) Mean for Web Usability?," Proceedings of the 5th Conference on Human Factors & The Web, XP002332999, Jun. 3, 1999.

PCT, Notification of Transmittal of International Preliminary Examination Report, 5 pages, Aug. 22, 2002.

Notification of Transmittal of the International Search Report or the Declaration (PCT Rule 44.1) mailed Sep. 7, 2004 (12 pages) re International Application No. PCT/US 03/23327, Jul. 25, 2003.

BizRate.com, Independent Merchant Evaluation, https://eval.bizrate.com/popchoice.pl?id=19383&rb=1&ip=204.194.97.2&xsum=67748, 1 pages, https://eval.bizrate.com/eval.pl?id=19383&ip=204.194.97.2&xsum=67748&g=102, 5 pages, printed Jun. 13, 2000.

P.R. Vora, "Designing for the Web: A Survey," design/methods & tools, interjections, pp. 13-30, May-Jun. 1998.

P. Katerattanakul, et al., "Measuring Information Quality of Web Sites: Development of an Instrument," from the 20th International Conference on Information Systems, 7 pages, Jan. 1999.

T.S. Tullis, "A Method for Evaluating Web Page Design Concepts," from CHI 98 Conference Summary on Human Factors in Computing Systems, ACM, ISBN 1-58113-028-7, 2 pages, Apr. 1998.

Unknown, "Different Versions of the Online Opinion Data collection Technique Dramatically Impact the Type of Response a Website Receives," OpinionLab, Inc., White Paper, 5 pages, ©2001.

C. Shahabi, et al. "Knowledge Discovery from Users Web-Page Navigation," XP010219671, ISBN: 0-8186-7849-6, Research Issues in Data Engineering, 1997 Proceedings, Seventh International Workshop in Birmingham, UK, Apr. 7-8, 1997, Los Alamitos, CA, USA, IEEE Computer Society US, pp. 20-29, Apr. 7, 1997.

J.H. Watt, et al., "Using the Internet for Audience and Customer Research," XP010355892, ISBN: 0-7803-579-09-4, Professional Communication Conference 1999, IPCC 99, Communication Jass: Improvising the New International Communication Culture, Proceedings 1999, IEEE International New Orleans, LA, USA, Sep. 7-10, 1999, Piscataway, NJ, USA, IEEE US, pp. 121-130, Sep. 7, 1999.

PCT, Notification of Transmittal of the International Search Report or the Declaration, 7 pages, Jan. 8, 2004.

Nickerson, et al., "System and Method for Measuring and Reporting Viewer Reactions to Interactive Content," U.S. Appl. No. 10/285,953, Oct. 31, 2002.

U.S. Appl. No. 12/328,741, filed Dec. 4, 2008, Nickerson.

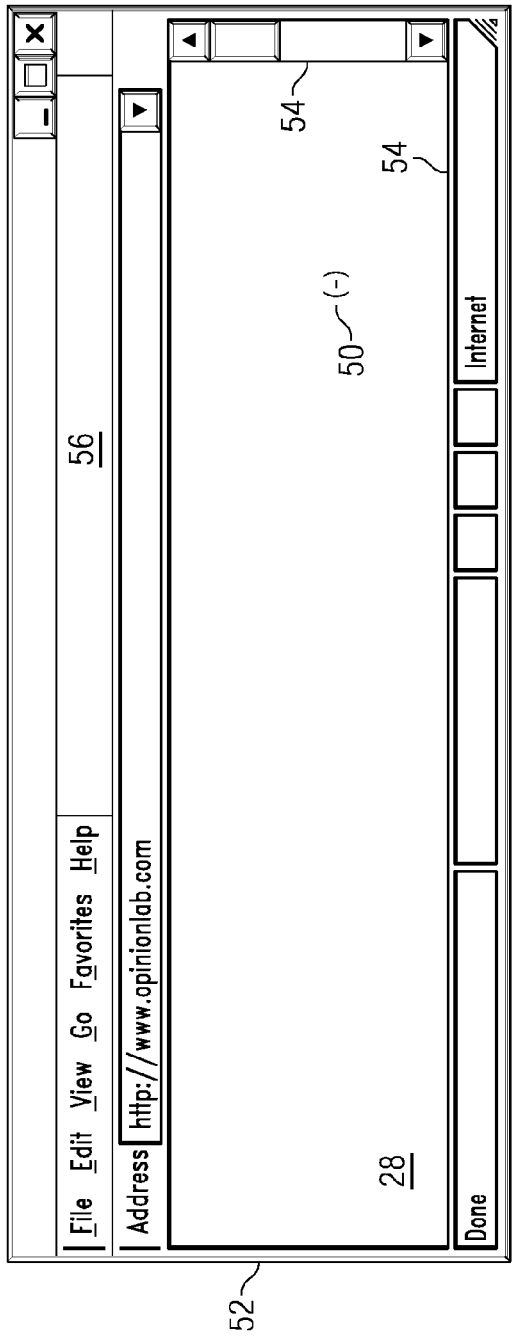
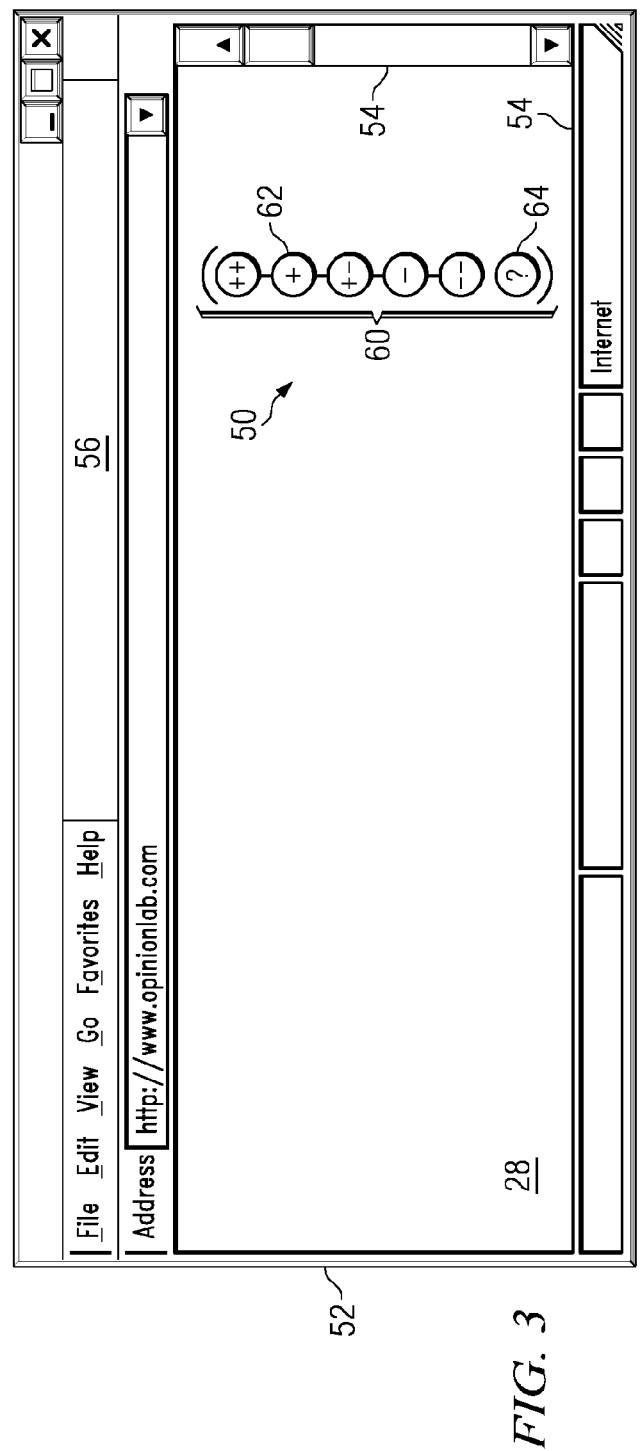

FIG. 6

1 COMMENTS

PLEASE ENTER YOUR COMMENTS ABOUT THIS PAGE.

CONTACT US ABOUT CUSTOMER SERVICE RELATED MATTERS

2 DETAILED PAGE RATINGS

CONTENT   DESIGN   USABILITY
++   ++   ++
+   +   +
+−   +−   +−
−   −   −
−−   −−   −−

3 OVERALL PAGE RATING

YOU MUST CLICK AN OVERALL PAGE RATING TO SUBMIT COMMENTS. THANK YOU.

++
+
+−
−
−−

PLEASE COMPLETE OUR USER REGISTRATION

FIG. 7

User Registration

By registering, you will be able to provide more useful feedback about websites you visit. Once you complete the following information, a cookie will store an ID with your browser that will identify your demographics with the ratings you make on a particular page.

You only need to complete the following information once and it will be associated with your ratings. You will use your password to update this information online.

Name:
Password:
E-mail Address:
Gender: select gender
Age: select age
Industry: select industry
Employment Status: select status Register Internet

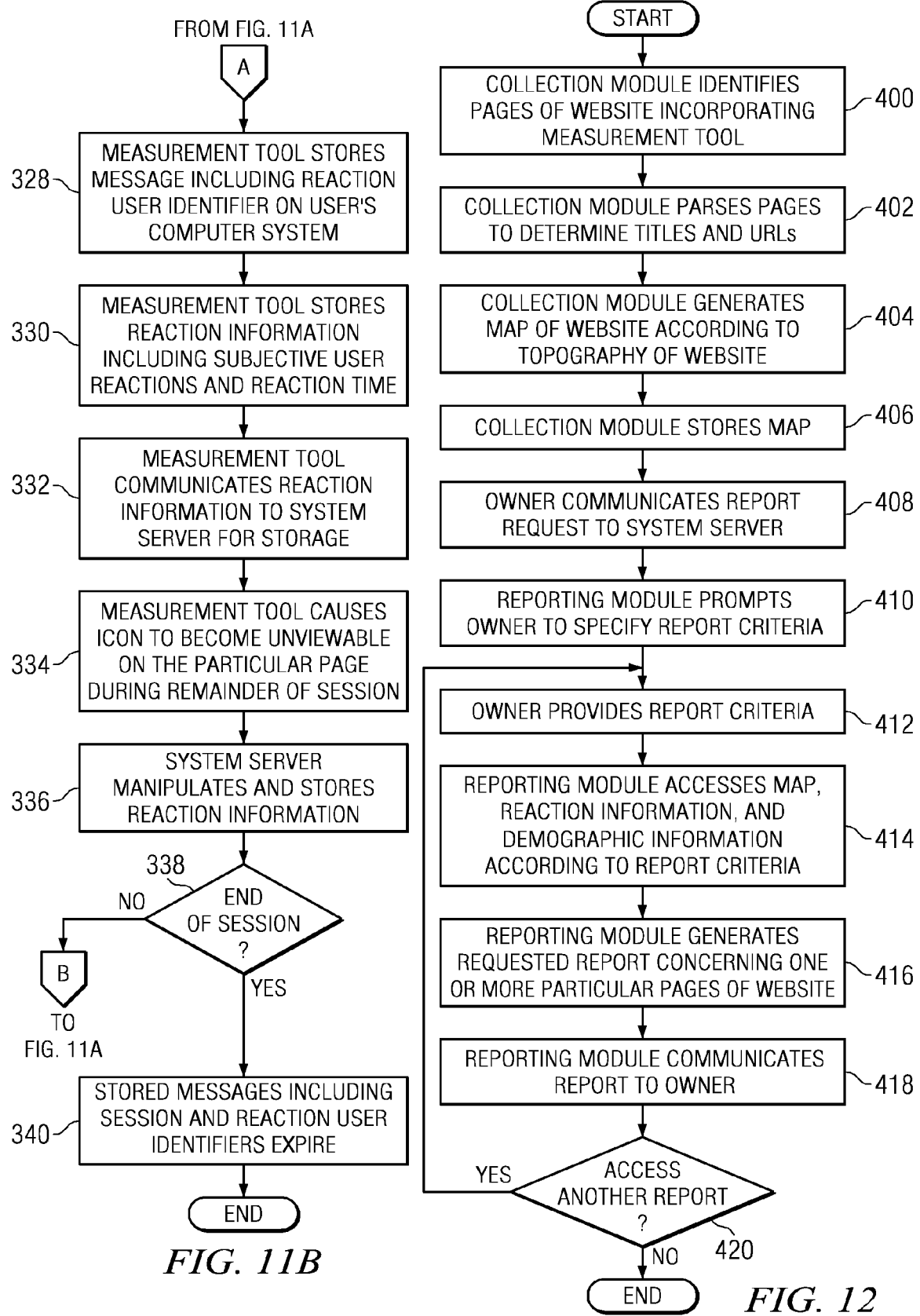

REPORTING TO A WEBSITE OWNER ONE OR MORE APPEARANCES OF A SPECIFIED WORD IN ONE OR MORE PAGE-SPECIFIC OPEN-ENDED COMMENTS CONCERNING ONE OR MORE PARTICULAR WEB PAGES OF A WEBSITE

RELATED APPLICATION

This application is a continuation under 35 U.S.C. §120 of U.S. patent application Ser. No. 10/210,609, filed 31 Jul. 2002.

TECHNICAL FIELD

This disclosure relates generally to user feedback on web pages.

BACKGROUND

Many website owners desire information concerning usage of their websites. For example, an Internet website owner might use a third party service to track the number of users that visit its website, the number of "clicks" these users collectively perform (using their mouse pointers) while visiting the website, and how long these users stay at the website. Using this objective information, the website owner may determine that its website is not attracting a sufficient number of users or has been ineffective at keeping the interest of users once they arrive. The website owner may respond accordingly to improve its websites and, possibly, the success of its associated business operations.

Previous techniques for obtaining information concerning usage of websites often do not provide website owners with information about how users subjectively react to their websites, making the information of minimal value. Prior techniques that do solicit user feedback do so with respect to transactions carried out using the website, but not with respect to the website itself. These techniques give website owners little if any information concerning feedback from users concerning particular pages of their websites. Moreover, website owners are given little if any information about how users experience their websites as the users navigate through them, moving from page to page according to the topography of the websites. Even techniques that request users to provide feedback concerning transactions may be relatively difficult to use, obtrusive, unstandardized, or otherwise deficient in some manner that causes them to be seldom used and therefore ineffective. The information reported to website owners may also be ineffective due to the format in which it is provided, for example, in reports that are difficult to interpret and do not allow useful comparisons to be made. These and other disadvantages make prior techniques inadequate for many website owners.

SUMMARY

Particular embodiments may reduce or eliminate problems and disadvantages associated with previous techniques for receiving and reporting user feedback concerning one or more particular web pages of a website.

In one embodiment, a method for reporting to a website owner one or more appearances of a specified word in one or more page-specific open-ended comments concerning one or more particular web pages of a website includes receiving one or more page-specific open-ended comments concerning one or more particular web pages of a website from users that have accessed the particular web pages, identifying, in the one or more page-specific open-ended comments concerning the one or more particular web pages of the website, each appearance of the specified word, and generating a report reflecting the identified appearances of the specified word in the one or more page-specific open-ended comments concerning the one or more particular web pages of the website.

Particular embodiments may provide one or more technical advantages. In particular embodiments, user feedback concerning particular pages of a website or an electronic mail (e-mail) message may be measured using software for measuring such feedback that may be readily identifiable (by one or more associated icons), easy to use, and unobtrusive. In particular embodiments, for example, a user need not separately download any software and open a new window in a browser of the user. As a result, valuable information may be readily compiled (including feedback concerning particular pages and other data that may be correlated to such feedback) and the likelihood of users providing such information may be substantially high in comparison with previous techniques. Additionally, software for measuring user feedback may, in particular embodiments, be easily incorporated into existing pages of a website or an e-mail message, which may reduce costs and delays typically associated with rewriting software code for the pages. These and other advantages may contribute to such feedback measurement software (and associated icons) becoming a standard across the entire community of Internet users.

In particular embodiments, one or more comments, answers to explicit questions, and subjective ratings concerning a particular page of a website or an e-mail message may be solicited from a user in any suitable combination. In particular embodiments, different questions may be associated with different web pages across a website including a number of web pages or an e-mail message including a number of pages. In particular embodiments, a user may be encouraged or even required to provide one or more subjective ratings concerning a particular page to provide one or more comments concerning the page. Such page-specific subjective ratings may make such comments more useful to a website owner or e-mail sender. In particular embodiments, background data reflecting one or more details of a computer system of a user, a web session of the user, or both may be obtained from the user in connection with the user providing one or more page-specific comments concerning a particular page. Such data may similarly make such comments more useful to a website owner or e-mail sender.

In particular embodiments, a user may provide one or more comments concerning a page of a website or an e-mail message using a comment window that is generated by a computer system remote from the user and subsequently communicated to a computer system of the user. This may allow a website owner to customize the comment window without modifying the page. In particular embodiments, a website owner or e-mail sender may customize a comment window in a number of ways, which may include specifying one or more explicit questions presented to users in the comment window or making any other suitable customizations. In particular embodiments, a website owner or e-mail sender may test a customized comment window before committing one or more customizations made by the website owner or e-mail sender.

Particular embodiments may enable a website owner or researcher acting on behalf of a website owner to conduct research related to one or more web pages of one or more websites. Particular embodiments may similarly enable law enforcement or regulatory personnel to conduct investigations concerning one or more owners of one or more websites. In particular embodiments, such research or investigations may be conducted without involving the owners of the websites and possibly without such owners even being made aware of such research or investigations.

Particular embodiments may provide reports to a website owner or e-mail sender that reflect a wealth of previously unavailable information concerning particular pages of a website or e-mail message and yet may be readily interpreted to allow useful comparisons among such pages. Moreover, particular embodiments may allows a website owner to access reports reflecting user feedback in much the same way a user might navigate from one page of a website to another page of the website according to the topography of the website. This may give the website owner additional valuable information providing a basis for decisions concerning the website. Particular embodiments may communicate to a particular e-mail address at particular times particular reports reflecting particular pages of a website or e-mail message. This may be useful, for example, where a website owner includes an organization that includes a number of different people having different responsibilities concerning a website. In particular embodiments, reports communicated to a website owner or e-mail sender may be filtered according to suitable filter criteria such that they reflect only particular user feedback, which may help the website owner or e-mail sender focus its attention to addressing particular feedback.

These and other advantages may make particular embodiments well suited for used in modern Internet and other environments in which users access websites, receive e-mail, or both. Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

FIG. 2 illustrates an example web page incorporating a user feedback measurement tool;

FIG. 3 illustrates an example web page incorporating a general feedback measurement tool;

FIG. 6 illustrates an example combined general feedback measurement tool and specific feedback measurement tool;

FIG. 7 illustrates an example web page for registering a user;

FIGS. 11A and 11B illustrates an example method of measuring a user's feedback to particular web pages of a website; and FIG. 12 illustrates an example method of reporting on user feedback to particular web pages of a website.

DESCRIPTION OF EXAMPLE EMBODIMENTS

Figure 1:
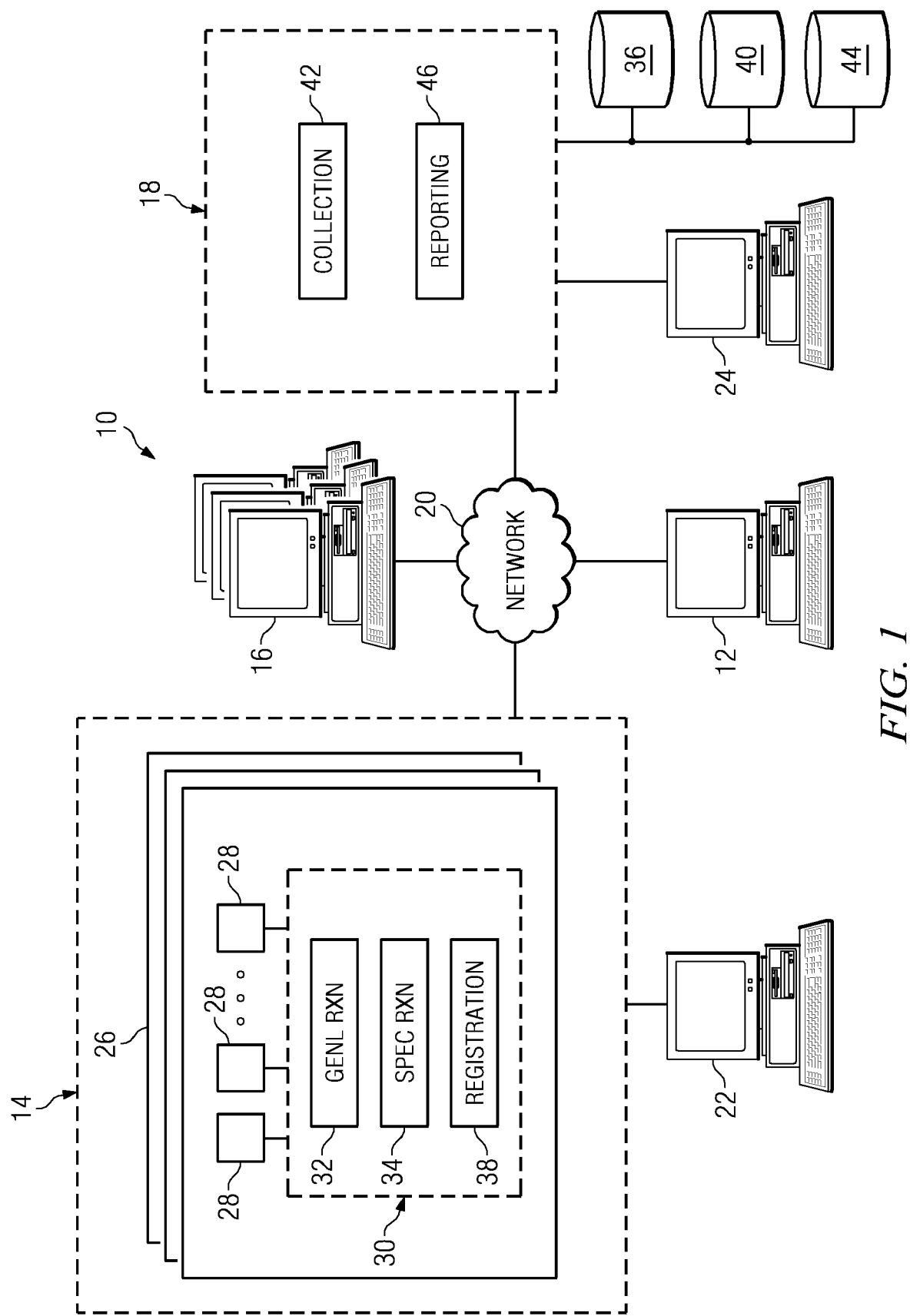
FIG. 1 illustrates an example system for measuring and reporting user feedback to particular web pages of a website.

FIG. 1 illustrates an example system 10 for measuring and reporting on user feedback concerning particular web pages associated with a website using one or more feedback measurement tools that are incorporated into and viewable on the pages. As described more fully below, in one embodiment, the feedback measurement tools are standardized across some or all of the web pages, are readily identifiable by users of the pages, and are intuitive, predictable, and easy for the users to use in providing feedback concerning the pages. As a result, these measurement tools provide a number of important technical advantages over previous techniques for measuring user input, which may merely measure and report website usage information or user feedback concerning transactions rather than user feedback on a page by page basis. Such systems are therefore incapable of providing meaningful feedback to website owners regarding the "topography" of their websites; that is, which of possibly numerous pages of a website have been rated particularly successful or unsuccessful in the eyes of users of the website as those users navigate through the pages of the website according their particular needs. Particular embodiments address these and other deficiencies.

Although particular embodiments are described primarily in connection with the measurement and reporting of user feedback concerning one or more particular pages of one or more websites, particular embodiments may be similarly applied in connection with polling, surveying, product development research, market research, usability testing, business-to-consumer (B2C) commercial transactions, business-to-business (B2B) commercial transactions, or any other suitable activity for which the measurement and reporting of user responses may be desirable.

System 10 includes a website owner 12, a web server 14, one or more website users 16, and a reporting server 18 coupled to one another using network 20, which may be any suitable local area network (LAN), metropolitan area network (MAN), wide area network (WAN), a global communications network such as the Internet, or any other suitable network. Although owner 12, server 14, users 16, and server 18 are described as coupled using a single network 20, the present disclosure contemplates multiple networks 12 of the same type or different types to couple these components to one another, according to particular needs. Owner 12 and users 16 may each be autonomous computer systems or may receive appropriate input from one or more associated persons. Servers 14 and 18 may including software operating on one or more computer systems 22 and 24, respectively, at one or more locations. Owner 12, server 14, and server 18 may operate on at least one shared computer system. The computer systems associated with owner 12, user 16, server 14, and server 18 include input devices, output devices, processors, memories, and other components suitable for the features and operation described below.

Web server 14 hosts or otherwise supports at least one website 26 including one or more pages 28. Although pages 28 are described primarily as web pages 28 associated with a typical website 26, the present disclosure contemplates measuring and reporting user feedback concerning files, documents, or any other formatted information. Moreover, although a single website 26 for a single owner 12 is described in detail, server 14 may support one or more websites 26 for each of multiple owners 12. In general, using an associated web browser or other software component, the user 16 provides a uniform resource locator (URL) or other electronic address to establish a connection to server 14 and access a particular page 28 associated with website 26. Server 14 communicates the requested page 28 to user 16 using network 20, user 16 receives page 28, and the user 16 views or otherwise processes page 28 according to the user's particular needs. User 16 will typically provide one or more additional URLs during a single browser session to access additional pages 28 associated with website 26, navigating through the topography of website 26 according to particular needs. Multiple users 16 may access a single page 28 substantially simultaneously. The present disclosure contemplates one or more website users 16 accessing one or more pages 28 of website 26 in any suitable manner during one or more browser sessions.

Each user 16 may have an opinion, assessment, feeling, or other subjective reaction to each page 28 communicated to the user 16, either in its entirety or more specifically to the format, content, design, or another characteristic associated with page 28. For example only and not by way of limitation, user 16 may consider a particular page 28 helpful, informative, understandable, humorous, or may otherwise have a positive or favorable reaction to page 28, generally or with respect to one or more specific aspects of page 28. Alternatively, for example and without limitation, user 16 may consider a particular page unhelpful, uninformative, confusing, boring, or may otherwise have a negative or unfavorable reaction to page 28, generally or with respect to one or more specific aspects of page 28. The strength of this subjective reaction, whether positive or negative, may vary from mild to very strong. Rather than having a positive or negative reaction, user 16 may have a neutral reaction to page 28. Moreover, the subjective reaction of user 16 to page 28, generally or as to specific aspects, may be different from the subjective reaction of user 16 to other pages 28 or to website 26 in its entirety. Feedback from a user 16 concerning a page 28 may reflect one or more reactions of user 16 to page 28 and may, where appropriate, include ratings, comments (which may include qualitative statements concerning page 28), answers to explicit questions (whether or not the subject of the question is related in some manner to page 28), or any other suitable general or specific user feedback concerning page 28.

In particular embodiments, feedback from users 16 concerning one or more particular pages 28 of website 26 are measured and compiled to allow system 10 to provide valuable information to owner 12 concerning the topography of website 26; that is, particular pages 28 and specific aspects of those particular pages 28 that have been successful or unsuccessful in the eyes of users 16 as users 16 navigate through pages 28 of the website 26. In one embodiment, server 14 supports a user feedback measurement tool 30 that is incorporated into pages 28 and may be communicated to user 16 with page 28 in response to user 16 requesting page 28.

As described below with reference to FIGS. 2 through 6, the tool 30 is preferably incorporated into page 28, both as a viewable icon and as suitable software components, in a manner that does not conflict with the existing design or coding of page 28. In a particular embodiment, tool 30 includes software code incorporated into the Hypertext Markup Language (HTML), Extensible Markup Language (XML), or other software code of page 28. Tool 30 also includes one or more JAVASCRIPTS, or other suitable scripts, that may be stored in a dedicated or other suitable directory. In the particular embodiment, the software code incorporated into page 28 calls the script in response to the user 16 selecting an icon associated with tool 30 to provide feedback. Tool 30 may be incorporated into one or more pages 28 of website 26, directly or indirectly such as through a call to a script within a dedicated directory, in any appropriate manner without departing from the intended scope of the present disclosure. In response to user 16 accessing the associated page 28, the incorporated software code and the directory containing the script are communicated with page 28 to user 16. Unless otherwise specified or appropriate, a reference to tool 30 is meant to include reference to the viewable icon, the script and its directory, the call to the script incorporated into the code of page 28, and any other components of tool 30, singly or in any combination. In one embodiment, the tool 30 continues to execute on the computer system of user 16, with associated page 28, until user 16 provides feedback or closes the user's web browser.

As described more fully below with reference to FIGS. 2 through 6, tool 30 may include a general feedback measurement tool 32 for measuring general feedback from user 16 concerning the associated page 28, for example only and not by way of limitation, according to a multi-level or another suitable subjective rating scale. Also as described more fully below with reference to FIGS. 2 through 6, instead of or in addition to general feedback measurement tool 32, tool 30 may include a specific feedback measurement tool 34 for measuring feedback from user 16 concerning one or more selected aspects of page 28, according to the same or a different subjective rating scale as for tool 32. For example and without limitation, tool 34 may measure feedback from user 16 concerning the content, design, usability, or any other suitable aspect of page 28, singly or in any combination. Feedback measured using tool 30, 32, or 34 may include responses to one or more explicit questions posed to user 16 concerning page 28, concerning one or more visual, audible, or other elements of page 28, concerning one or more items with which page 28 is logically associated, or concerning any other suitable subject. As described more fully below, tools 30, 32, and 34 may allow a user 16 to provide comments or access additional information concerning the rating scale, tool 30, 32, or 34, website 26, owner 12, or any other appropriate aspect of system 10. Feedback and related input received from users 16 may be stored temporarily on the computer system of user 16, within tool 30, or at another suitable location before being communicated to server 18 for storage within database 36, which may include one or more data storage locations integral to or separate from computer system 24.

In one embodiment, feedback measurement tool 30 includes registration module 38 for collecting appropriate demographic or any other suitable information associated with user 16. Using such demographic information, feedback from user 16 concerning pages 28 may be categorized and analyzed to obtain further information that may be valuable to owner 12 or to others. Not only can demographic information be correlated to user feedback, but the linking between demographic information and user feedback may be used to determine additional information about the correlation between user feedback and other metrics. For example, system 10 or another system may collect website traffic data, along with demographic information requested from website visitors, such that the traffic data may be correlated with the demographic data. System 10 may collect user feedback data, along with demographic information requested from users 16, such that the user feedback data may be correlated with the demographic data. Since in this example both the website traffic data and the user feedback data are correlated with demographic information, the traffic data and user feedback data may be correlated with one another to provide owner 12 or others with potentially valuable information. It may also be desirable to present the traffic data and user feedback data together in an integrated fashion, with or without the linking demographic information, using a single "dashboard" or other suitable visual display. Any set of two or more metrics may be correlated in an analogous manner, using a common link to demographic or other suitable compiled information, and presented together using a single visual display.

As described more fully below with reference to FIG. 7, the registration module 38 may be implemented using a registration page or pop-up window that is presented to a user 16 at least the first time the user 16 selects tool 30 to provide feedback concerning a page 28 of website 26. The demographic information received from users 16 is communicated to server 18 for storage in database 40, which may include one or more data storage locations integral to or separate from database 36 and computer system 24. This demographic information may be accessible to users 16, with appropriate password protection, to allow the users 16 to add to, delete, or modify some or all of their associated demographic information, as appropriate. Alternatively, users 16 might communicate appropriate modifications, using e-mail for example, to a person responsible for implementing such modifications. Although a particular registration procedure is described, user 16 may register in any appropriate manner, for example, by facsimile, regular mail, or telephone (possibly using an interactive voice response (IVR) system).

In general, website owner 12 is any entity responsible for at least one aspect associated with website 26, for example only, financing, creation, editing, approval, review, implementation, administration, or any other suitable aspect associated with website 26. Owner 12 interacts with servers 14 and 18 as appropriate to set up and administer one or more websites 26 hosted or otherwise supported on server 14, including incorporating tool 30 into pages 28 and accessing any reporting information on feedback from users 16 concerning pages 28. Before allowing owner 12 to incorporate tool 30 and the associated software components into pages 28, server 18 may require that owner 12 provide appropriate identification, billing, and other information; may notify owner 12 that website 26 may be "crawled" to identify and gather data pertaining to pages 28; may provide owner 12 with a license agreement or other information concerning services being provided to owner 12; and may communicate any other appropriate information with owner 12. Server 18 may store some or all of the registration and setup information described above in one or more appropriate storage locations (not explicitly shown) according to particular needs. Server 18 may also assign owner 12 an identifier and password for use in accessing reports concerning one or more particular pages 28 of website 26, as described more fully below. Although server 18 is described as handling the registration of owner 12, owner 12 may register in any appropriate manner, such as by facsimile, by regular mail, or by telephone (possibly using an interactive voice response (IVR) system).

After appropriate information has been communicated between owner 12 and server 18 and, if desirable, verified in some appropriate manner, owner 12 may use a wizard or other software component to download or otherwise communicate one or more pages 28 (or preferably copies of pages 28) of the website 26 from server 14 to the computer system of owner 12. Pages 28 may be communicated to owner 12 using File Transfer Protocol (FTP) or in any other suitable manner, singly or as a group. Owner 12 may specify, for each page 28, the type of viewable icon the owner 12 wants to appear on page 28, the color of the icon, or any other suitable characteristic of the icon. In one embodiment, characteristics of the icon may include one or more explicit questions concerning page 28, concerning one or more visual, audible, or other elements of page 28, or concerning one or more items with which page 28 is logically associated. Where appropriate, the characteristics of the icon may include any explicit question, whether or not the subject of the question is related in some manner to page 28.

To specify an icon and its characteristics, as an example only and not by way of limitation, owner 12 might click on the desired icon, which might be one of multiple standard icons, and manipulate its characteristics using pull down menus. Owner 12 might then click on, drag and drop, or otherwise incorporate the desired icon into the local version of the page 28. The incorporation might instead occur automatically in response to owner 12 specifying characteristics of the icon. The wizard may create a dedicated or other suitable directory containing the script of tool 30 and, in addition, paste or otherwise incorporate a call to the script in the software code of the page 28. Owner 12 may use the wizard or another software component to upload or otherwise communicate each modified page 28 (incorporating the tool 30) back to the server 14, singly or as a group, to replace corresponding previous page 28 (not incorporating tool 30) within website 26. The process through which owner 12 may incorporate tool 30 in one or more pages 28 provides an important technical advantage of particular embodiments. In one embodiment, incorporation of tool 30 in pages 28 frees users 16 from needing to download separate software (separate from accessing page 28) or open a separate window to provide user feedback using tool 30, providing another important technical advantage.

Alternatively, server 18 might communicate tool 30 directly to server 14 for automatic incorporation into pages 28. Less desirably, server 18 might communicate to owner 12 a file containing the software code to be incorporated into the code of pages 28 and also containing the directory with the script to be called when user 16 selects tool 30 to provide feedback. Owner 12 may download from server 14 or otherwise obtain a local version of each page 28, manually edit each of the pages 28 by pasting in the appropriate software components, and then upload or otherwise communicate modified pages 28 (incorporating tool 30) back to server 14, singly or as a group, to replace previous pages 28 (not incorporating tool 30) within website 26. As another alternative, the tool 30 might be incorporated into page 28 as page 28 is constructed, such as with an entirely new website 26 or when new content is added to an existing website 26.

Although a number of possible alternatives are described in detail, tool 30 may be incorporated into pages 28 of website 26 in any suitable manner without departing from the intended scope of the present disclosure. Moreover, although a web page 28 is primarily described, the present disclosure contemplates tool 30 being incorporated into or otherwise associated with an e-mail message, advertisement, Graphics Interface Format (GIF) file, or other suitable collection of information communicated to user 16, whether or not considered a web page 28. Any such collection of information incorporating tool 30 may be considered a page 28, where appropriate. For example, tool 30 may be incorporated into an HTML or other e-mail message (which may include one or more attachments) communicated to user 16 and soliciting feedback from user 16 concerning the content, delivery, or other aspect of the e-mail. Upon receiving the e-mail message, user 16 might open the e-mail message, click on or otherwise select the icon to provide solicited feedback, and thereby cause user feedback information to be communicated to server 18 for collection and reporting. Incorporating tool 30 into e-mail messages may be particularly useful in connection with bulk e-mail messages. Previously, feedback from users 16 concerning such messages has been measured according to "click through" (or "conversion") rates or response rates. However, such techniques do not provide diagnostic data reflecting whether the messages, offers in the messages, or other aspects of the messages are good or bad in the eyes of users 16 or why such aspects of the messages are good or bad. In particular embodiments, an e-mail message may include an icon (near the bottom of the message or elsewhere) associated with tool 30 that solicits user feedback (which may include ratings, answers to explicit questions, comments, or other suitable user feedback) concerning the message. Soliciting user feedback concerning bulk e-mail in this manner may provide a higher rate of response and more useful information than previous techniques.

As still another possible alternative within the scope of the present disclosure, tool 30 may be embedded or otherwise incorporated into the user's web browser rather than pages 28 to provide substantially equivalent functionality. In one embodiment, user 16 may download tool 30, either as part of accessing a page 28 or directly, and perform any appropriate subsequent operations to incorporate tool 30 into the web browser. Tool 30 may be installed each time user 16 accesses a page 28 or may be installed the first time user 16 accesses a page 18 and remain installed until user 16 desires to uninstall the tool 30. If the tool 30 is incorporated into the web browser rather than page 28, the viewable icon associated with tool 30 may appear in the "masthead" area of the browser window, may appear so as to obscure some or all of page 28 within the browser window, or may appear in any other suitable location and in any other suitable manner, according to particular needs.

As described more fully below, a user 16 may be allowed to provide one or more page-specific comments regarding a page 28. For example, in response to user 16 selecting an icon associated with tool 30, a comment window may appear allowing user 16 to provide one or more page-specific comments. Such a window may, in addition or as an alternative, appear automatically independent of input from user 16. In addition or as an alternative to allowing user 16 to provide one or more comments, user 16 may be allowed to provide one or more answers to explicit questions regarding page 28. For example, a comment window that may appear in response to user 16 selecting an icon associated with tool 30 may include one or more explicit questions regarding page 28. Tool 30 may generate the comment window, receive comments, answers to questions, or both from user 16, and communicate the received feedback to reporting server 18. In certain embodiments, as described more fully below, user 16 may be encouraged, or even required, to provide a page-specific rating to provide comments or answers to explicit questions regarding page 28. The comments or answers may be correlated with and evaluated in view of the associated ratings to provide deeper and more usable information regarding page 28.

In addition or as an alternative to tool 30 generating a comment window locally at a computer associated with user 16, tool 30 may automatically request a comment window from a remote server separate from a web server 14 hosting a website 26, such as reporting server 18. The remote server may be operated by an entity separate from an owner 12 of page 28. In response to the request, the remote server may generate the requested comment window and communicate it to tool 30, which may then present the comment window to user 16. A server remote from tool 30 generating the comment window may provide one or more advantages. For example, owner 12 may access a secure area of the remote server to customize the comment window, for all pages 28 or for particular pages 28, without modifying pages 28 or a browser of user 16. Owner 12 may customize the comment window in any suitable manner. For example, owner 12 may specify text in the comment window soliciting comments or answers to explicit questions in the comment window, one or more colors in the comment window, or any other suitable aspect of the comment window. After owner 12 has customized the comment window, owner 12 may be allowed to test the comment window. For example, owner 12 may indicate a desire to test the comment window and, in response, page 28 may be communicated to owner 12. Owner 12 may then test the comment window, for example, by selecting an icon associated with tool 30 to cause the comment window to appear. As a result, owner 12 may be able to substantially immediately determine how customizations of the comment window will appear to users 16. After testing the comment window, owner 12 may commit the customizations or make changes to the customizations and retest the comment window as appropriate.

In particular embodiments, tool 30 may be incorporated into a computer system of a user 16 such that tool 30 need not be incorporated into a page 28 for user 16 to provide feedback concerning page 28. For example, tool 30 may be incorporated into a web browser or other software component of a computer system of user 16, and user 16 may access page 28 and provide feedback concerning page 28 without tool 30 being incorporated into page 28 (and thus without modifications being made to page 28). For example, a website owner 12 or a competitive or other researcher acting on behalf of a website owner 12 may instruct one or more users 16 to access one or more particular pages 28 of one or more particular websites 26 of one or more particular owners 12 and provide feedback concerning pages 28. By tool 30 being incorporated into computer systems of users 16, tool 30 need not be incorporated into pages 28 for users 16 to provide such feedback. This may be particularly useful, for example, where an owner 12 wishes to collect feedback concerning a website 26 of a competitor without the competitor being involved in the competitive research or even being made aware that such feedback is being collected. An owner 12 may also collect feedback concerning a website 26 of owner 12 to test new website designs or for any other suitable purpose. As another example, this may also be useful where law enforcement or regulatory personnel wish to investigate an owner 12 of a website 26 for violations of one or more laws or regulations, for example, false or misleading advertising or product descriptions. As yet another example, this may be useful where an owner 12 wishes to ascertain whether users 16 consider one or more marks being used by a competitor on a page 28 to be confusingly similar to one or more trademarks of owner 12.

As described above, tool 30 may automatically request a comment window from a remote server separate from a web server 14 hosting a website 26, receive the requested comment window from the remote server, and present the received comment window to a user 16. Where tool 30 is incorporated into a computer system of user 16 for research or other purposes as described above, tool 30 may thus automatically request comment windows from a remote server for user 16 to provide feedback concerning accessed pages 28. A server remote from tool 30 generating the comment window may provide one or more advantages. Where a user 16 is accessing pages 28 at the direction of an owner 12 or a researcher acting on behalf of owner 12, for example, the owner 12 or researcher may access a secure area of the remote server to customize comment windows for providing feedback concerning pages 28 without modifying pages 28 (which may be impractical where the feedback concerning a website 26 must be collected without an owner 12 of website 26 being involved in the research or even being made aware that such feedback is being collected) or a computer system of user 16. The comment window may be customized in any suitable manner. For example, owner 12 or the researcher acting on behalf of owner 12 may specify text in the comment window soliciting comments or answers to explicit questions in the comment window, one or more colors in the comment window, or any other suitable aspect of the comment window. After owner 12 or the researcher has customized the comment window, owner 12 or the researcher may be allowed to test the comment window. For example, owner 12 or the researcher may indicate a desire to test the comment window and, in response, page 28 may be communicated to owner 12 or the researcher. Owner 12 or the researcher may then test the comment window, for example, by selecting an icon associated with tool 30 to cause the comment window to appear. As a result, owner 12 or the researcher may be able to substantially immediately determine how customizations of the comment window will appear to users 16. After testing the comment window, owner 12 or the researcher may commit the customizations or make changes to the customizations and retest the comment window as appropriate.

Periodically or in response to receiving feedback information from a user 16 concerning one or more particular pages 28 of website 26, collection module 42 of server 18 may perform a "crawl" to identify the pages 28 that are associated with website 26 (and possibly other websites 26) and incorporate tool 30. Based on this information, the collection module 42 may generate a map or other suitable report concerning the topography of website 26 and store the map in a database 44, which may include one or more storage locations integral to or separate from database 36, database 40, and server 18. In one embodiment, the pages 28 are parsed to identify their titles, URLs, and other suitable information for use in generating the map. Reporting module 46 uses the map to generate reports concerning the pages 28 of website 26, which might be linked to one another according to the topography of website 26 as described more fully below with reference to FIG. 9. Owner 12 may subsequently modify one or more pages 28 of website 26 according to the subjective ratings or other feedback received from users 16 (and possibly their demographic profiles), as reflected in the reports, to improve the pages 28 or better tailor the pages 28 for particular categories of users 16.

In some cases, owner 12 may be an organization and different persons within the organization might be responsible for different sets of one or more pages 28 of website 26. This may be an especially likely scenario when the owner 12 is a large company and website 26 includes a large number of pages 28. In one embodiment, when owner 12 is registering with server 18, owner 12 is requested to provide the e-mail address or other contact information for each such person, to identify pages 28 for which the person is responsible, and specify contact criteria. The information may be stored in a storage location (not explicitly shown) at or otherwise accessible to server 18. The contact criteria may apply to all the pages 28 for which the person is responsible or for one or more selected pages 28. For example, the contact criteria might specify that if a page 28 receives five negative ratings within a specified time period, the person associated with that page 28 will be automatically informed using the stored e-mail address. Moreover, if a user 16 provides comments using the icon associated with a page 28, the comments may be automatically communicated to the person associated with that page, as the comments are received or periodically as a group. The present disclosure contemplates any suitable threshold or other contact criteria, according to particular needs.

In the operation of system 10, owner 12 interacts with servers 14 and 18 as appropriate to register the owner 12 and download or otherwise incorporate tool 30 into one or more pages 28 of website 26. The user 16 accesses a particular page 28 incorporating tool 30 during a browser session and uses tool 30 to provide general or specific feedback concerning page 28. In one embodiment, if user 16 has not previously accessed any page 28 incorporating tool 30 during the browser session, tool 30 may determine an Internet Protocol (IP) or other electronic address for the computer system associated with user 16 and, when technically feasible, determine a hostname for the computer system. This preferably allows user feedback to be associated with a particular computer system coupled to network 20. Tool 30 may attempt to store a cookie, token, or other appropriate message including a browser session identifier on the user's computer system, using the user's web browser or in any other manner. Each time user 16 accesses another page 28 incorporating tool 30 during the browser session, tool 30 may access this stored message and respond accordingly.

In response to user 16 providing general or specific feedback concerning page 28, tool 30 may also attempt to store on the user's computer system a cookie, token, or other message that includes a feedback user identifier, which tool 30 may access as appropriate during the remainder of the browser session. The tool 30 may store the feedback user identifier on the user's computer system, possibly along with the time and date at which user 16 provided the feedback. After user 16 provides feedback concerning page 28, tool 30 may cause a previously viewable icon associated with tool 30 to become unviewable on page 28 for the remainder of the browser session (if user 16 returns to page 28), for as long as user 16 remains on page 28, for a specified time period, or otherwise. As a result, user 16 may be allowed to provide feedback concerning page 28 only once, for example, during a browser session or a specified time period, which may make the reported results more meaningful.

For example, if tool 30 causes the icon to become unviewable on a first page for which user 16 provided feedback, user 16 accesses a second page 28, and user 16 later returns to first page 28 during the same browser session, then tool 30 may recognize this based on the stored message including the feedback user identifier and prevent the icon from appearing on first page 28 for this and any other subsequent accesses of first page 28 during the browser session. Alternatively, tool 30 might allow the associated icon to remain viewable and might receive subsequent feedback from user 16 concerning first page 28, but might simply ignore such subsequent feedback. Of course, tool 30 may simply receive from user 16 and process all the feedback concerning a particular page 28, whether or not feedback is received from user 16 concerning page 28 during the same browser session or during a specified time period. In one embodiment, the cookies, tokens, or other messages that tool 30 stores on the user's computer system, including at least the browser session identifier and feedback user identifier, may expire when user 16 closes the user's web browser.

In one embodiment, user 16 is asked to provide demographic information the first time the user 16 provides feedback concerning a page 28 associated with a website 26 supported on server 14 and incorporating tool 30. If user 16 provides the requested demographic information, tool 30 and server 14 communicate the information to the server 18 for storage in database 40. Tool 30 may also assign a demographic user identifier and store it on the user's computer system in the form of a cookie, token, or other suitable message. In one embodiment, this allows reports to be generated that reflect the demographic information, correlating it to user feedback information, and gives owner 12 further valuable information regarding pages 28 of website 26. The demographic user identifier is preferably the same as the feedback user identifier to allow the feedback information and demographic information to be readily associated with one another. As discussed above, demographic information linked to feedback information may be used correlate the feedback information with one or more other metrics that are similarly linked to demographic information.

If user 16 previously provided demographic information and accepted the associated cookie, token, or other message with the demographic user identifier, tool 30 determines this each time user 16 accesses another page 28 of website 26, during the same or a different browser session. Ideally, user 16 is requested to and does provide the demographic information the first time user 16 accesses a page 28 that incorporates tool 30. However, if user 16 elects not to provide some or all requested demographic information, tool 30 may again invite user 16 to provide demographic information in response to user 16 selecting tool 30 to provide subsequent feedback concerning the same or a different page 28. Tool 30 might stop requesting the demographic information, at least for a specified period, after a specified number of refusals so as not to unduly alienate the user 16 or deter user 16 from providing feedback concerning pages 28 or from even accessing pages 28.

User identifiers for user 16 may also be used for a variety of other suitable purposes. For example, according to a user identifier stored as a cookie, token, or other message on the user's computer system, tool 30 may cause a particular question to be presented to user 16 in response to user 16 providing feedback. As a more particular example, every tenth time the user 16 selects tool 30 to provide feedback concerning an associated page 28, tool 30 might cause a question to appear inviting user 16 to indicate (in addition to providing feedback) whether user 16 is a customer of website 26 or its owner 12. User 16 might be given an opportunity to provide comments in addition to answering "Yes" or "No." Such questions could be presented in response to the user 16 actually providing feedback using tool 30, instead of merely selecting tool 30.

In response to user 16 providing general or specific feedback concerning a page 28, tool 30 may store the feedback temporarily in memory on the computer system associated with user 16 before instructing the computer system to communicate the feedback to server 18. Tool 30 may also collect the time and date at which user 16 provided the feedback. Tool 30, using the user's computer system, may communicate user feedback information for page 28 to server 18 before or after user 16 leaves page 28. In one embodiment, feedback information may include the title, URL, start time and date, feedback time and date, user feedback, and feedback user identifier, in any combination and without limitation. Feedback information may additionally include "web profile" information for the user 16, such as the IP address, hostname, username, password, network connection, operating system, web browser, screen resolution, plug-ins, or any other appropriate aspects of the user's environment. A feedback user identifier may be used to track feedback from a particular user over time or for any other suitable purpose. Tool 30 may compute the time user 16 spent on page 28 before providing feedback or may leave this task for server 18 to perform.

Server 18 receives and accepts the feedback information. This may include determining the title, URL, feedback from user 16, and feedback user identifier; computing the time user 16 spent on the page 28 before providing the feedback; and other appropriate operations. In one embodiment, server 18 attempts to match the received feedback user identifier with a stored demographic user identifier and, according to the match, associate the demographic information with the feedback information. The server 18 stores some or all of the feedback information, preferably in association with the demographic information, in database 36 for use in generating reports accessible to owner 12. Server 18 may communicate a message to user 16, through the user's web browser or otherwise, to inform user 16 that the feedback was successfully received. As multiple users 16 provide feedback concerning pages 28 as they navigate through website 26 according to its topography, a wealth of information concerning pages 28 may be assembled and later provided to owner 12 for use in improving particular pages 28 and thus website 26 as a whole. To access one or more reports reflecting this information, the owner 12 communicates report requests to server 18 and, in response, receives the requested reports.

FIG. 2 illustrates an example web page 28 incorporating user feedback measurement tool 30. In one embodiment, as described above, tool 30 provides a mechanism for measuring feedback from users 16 concerning page 28 that is standardized across some or preferably all pages 28 of website 26, is readily identifiable by users 16, and is intuitive, predictable, and thus easy for users 16 to use in providing feedback concerning pages 28. In a more particular embodiment, the tool 30 appears to users 16 as a language-independent icon 50, viewable on page 28 within the user's browser window, that periodically or continuously spins, flips, switches, animates, or otherwise alternates between "(+)" and "(−)" symbols, "[+]" and "[−]" symbols, "+" and "−" symbols, or any other suitable variation of plus and minus symbols.

For example only and not by way of limitation, parentheses around the plus and minus symbols may meet (or nearly meet) above and below the plus and minus symbols to resemble a capital "O" or oval. Analogously, square brackets around the plus and minus symbols may meet (or nearly meet) above and below the plus and minus symbols to resemble a square. Furthermore, although variations of plus and minus symbols are primarily described, any suitable stationary or animated icon 50 may be used to represent the association of tool 30 with page 28, and the opportunity to provide feedback, without departing from the intended scope of the present disclosure. Preferably, icon 50 is the same or substantially the same across all pages 28 of website 26 and, more preferably, pages 28 of other websites 26. This may contribute to the icon 50 becoming a readily identifiable and well accepted standard throughout the community of all users 16 of websites 26.

Typically, only a portion of page 28 will be viewable within browser window 52 at any one time as user 16 scrolls or otherwise navigates through page 28. In one embodiment, icon 50 appears at or near a specified location relative to the border 54 of browser window 52 in the viewable portion of page 28. Icon 50 may remain in substantially the same location relative to border 54 as user 16 scrolls or otherwise navigates through page 28. Alternatively, icon 50 might be located in the masthead region 56 of the browser window and remain in masthead region 56 as the user 16 scrolls or otherwise navigates through page 28. Causing icon 50 to remain in substantially the same location within browser window 52 may help encourage user 16 to provide feedback concerning page 28 using tool 30, and make it easier for user 16 to do so. This feature may further contribute to icon 50 becoming readily identifiable and well accepted throughout the user community.

As illustrated in FIG. 3, in response to the user 16 rolling an associated mouse pointer over icon 50, pointing to and clicking on icon 50 using the mouse pointer, touching icon 50 using an associated touch screen, or selecting icon 50 in another suitable manner, icon 50 may change into or be replaced with a multi-level subjective rating scale 60 that corresponds to general feedback measurement tool 32. In a particular embodiment, rating scale 60 includes five levels ranging from very negative to very positive, each level having an associated language-independent or other appropriate symbol 62. For example and without limitation, a "−−" symbol 62 might correspond to a very negative rating, a "−" symbol 62 might correspond to a somewhat negative rating, a "+−" symbol 62 might correspond to a neutral rating, a "+" symbol 62 may correspond to a somewhat positive rating, and a "++" symbol 62 may correspond to a very positive rating. Although a five level rating scale 60 is described above in connection with a particular embodiment, any appropriate multi-level or other subjective rating scale or scheme may be used without departing from the intended scope of the present disclosure.

To record general feedback concerning page 28, the user 16 clicks on, points to, or otherwise selects an appropriate symbol 62 reflective of the feedback. In response, tool 32 (or tool 30) may store the user feedback information and, at the appropriate time, cause the feedback information to be communicated to server 18 for storage in database 36. In a particular embodiment, the user feedback information collected in response to user 16 providing general feedback concerning the page 28 may include, in any suitable combination and without limitation: (1) the title of page 28; (2) the URL for page 28; (3) the feedback user identifier; (4) the subjective rating (for example only, "++," "+," "+−," "−," or "−−"); (5) the time and date page 28 was accessed; (6) the time and date the subjective rating was received; (7) the web profile information for user 16; and (8) any other suitable information. According to the demographic user identifier, if one is available at server 18, the demographic information for user 16 may be stored in association with the user feedback information in database 36, as described more fully above.

Where appropriate, feedback concerning page 28 collected using tools 30 and 32 may include responses to one or more explicit questions posed to the user 16 concerning page 28, concerning one or more visual, audible, or other elements of page 28, or concerning one or more items with which page 28 is logically associated. Questions may be presented instead of or in addition to rating scale 60. As an example, a page 28 of a vehicle manufacturer's website 26 may include a picture of a particular make and model of vehicle. Questions posed to user 16 using tool 30 or 32, in response to the user 16 selecting icon 50, might include "How well do you like this picture?" or "Do you like the shape of the tail fin?" for example. The responses to the questions might be received using rating scale 60, similar to collection of user feedback concerning page 28 described above, or might be received using a color or other suitable scale. For example, user 16 might select a green box, dot, or other visual element to provide a "Yes" response, might select a white box, dot, or other visual element to provide a "neutral" response, and might select a red box, dot, or other visual element to provide a "No" response. Each question may appear within a banner, bar, flag, or other visual element in response to user 16 selecting icon 50, in response to user 16 providing feedback concerning page 28 using tool 30, 32, or 34, or otherwise. A particular color, shape, or other indicia associated with the element may always signify the same question, regardless of the page 28 on which it appears. For example only, a green element might always signify the question, "Do you consider the price of this item fair?" A particular question may be posed in response to the user 16 providing a particular subjective rating of the page 28 or a particular response to a previous question, the question presented being dependent upon the previous response. In particular embodiments, one or more questions may be associated with any one or more pages 28 of website 26 according to the particular needs of owner 12, providing an important technical advantage. In particular embodiments, different questions may be associated with different pages 28 of a website 26. For example, an owner 16 of website 26 may specify one or more first questions regarding a first page 28 of website 26, one or more second questions regarding a second page 28 of website 26, one or more third questions regarding a third page 28 of website 26, and so on.

Some or all of the stored information concerning page 28 may be provided to owner 12 in the form of one or more suitable reports to allow owner 12 to assess the success of the particular page 28 in the eyes of the user community. As described more fully above with reference to FIG. 1, icon 50 may cease to be viewable in browser window 52 after general feedback concerning page 28 has been received from user 16. Although in one embodiment only tool 32 (not tool 34) may be viewable on page 28 in response to selection of tool 30, the present disclosure contemplates tool 34 being visible on page 28 instead of or in addition to tool 32.

Figure 4:
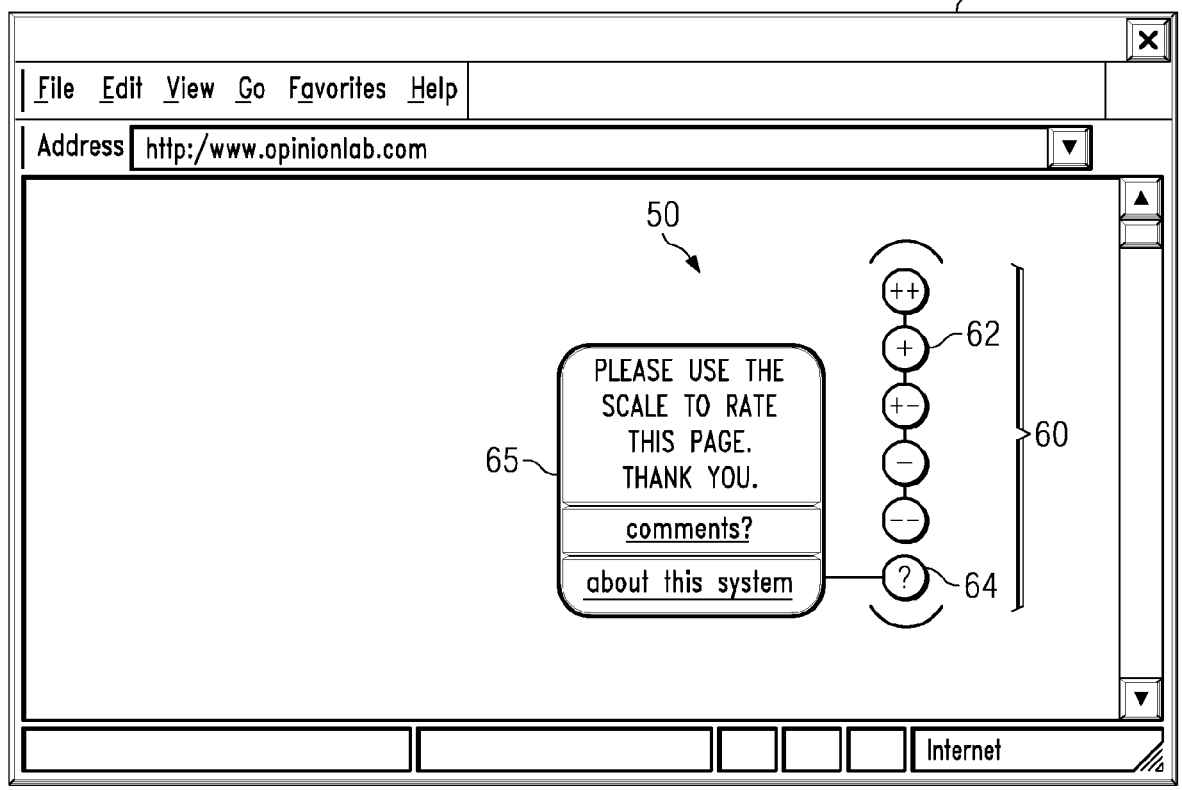
FIG. 4 illustrates another example general feedback measurement tool.

In one embodiment, a question mark or other symbol 64 may be associated with rating scale 60 to allow user 16 to provide comments relating to page 28, one or more specified aspects of page 28, one or more items associated with page 28, or any other appropriate comments. Symbol 64 might further allow user 16 to receive help or other information relating to tool 30, tool 32, tool 34, or system 10. For example, as illustrated in FIG. 4, a window 65 may appear with rating scale 60 in response to user 16 selecting symbol 64. Alternatively, rating scale 60 incorporating window 65 might appear in response to user 16 initially selecting icon 50, without requiring user 16 to first select symbol 64. Furthermore, as described more fully below with reference to FIG. 6, a pop-up window containing rating scale 60 associated with tool 32, one or more rating scales associated with tool 34, and a field to receive the comments or help requests may be presented to the user 16 in response to user 16 selecting symbol 64, selecting icon 50, or otherwise.

Figure 5:
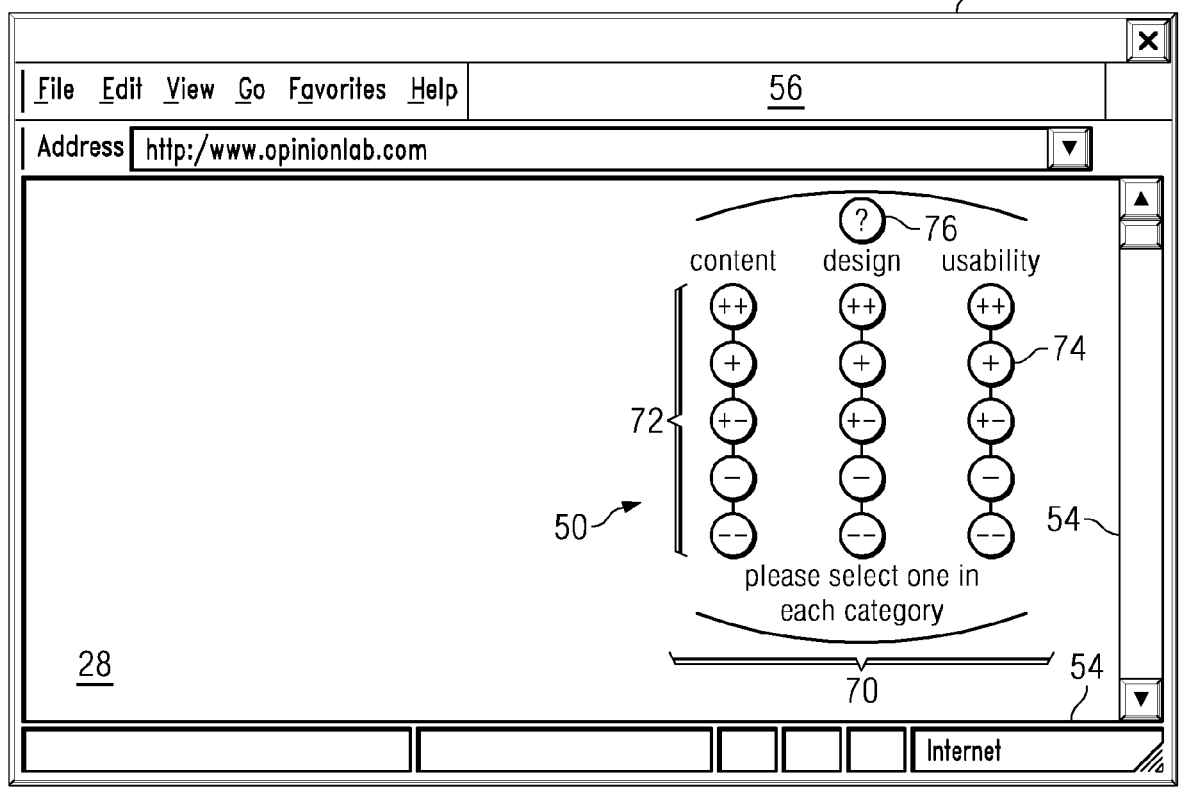
FIG. 5 illustrates an example web page incorporating a specific feedback measurement tool.

As illustrated in FIG. 5, in response to the user 16 rolling an associated mouse pointer over icon 50, pointing to and clicking on icon 50 using the mouse pointer, touching icon 50 using an associated touch screen, or selecting icon 50 in another appropriate manner, icon 50 may change into or otherwise be replaced with set 70 of one or more multi-level rating scales 72 corresponding to specific feedback measurement tool 34. Each of the rating scales 72 is used to measure the feedback of user 16 concerning a specified aspect of the particular page 28, according to the same or a different multi-level rating scale as for tool 32. For example only and not by way of limitation, tool 30 may have separate rating scales 72 for measuring the feedback from user 16 concerning the content, design, usability, or other suitable aspects of page 28, singly or in any appropriate combination. As described above, feedback concerning page 28 may include responses to one or more explicit questions concerning page 28, concerning one or more elements of page 28, concerning one or more items with which page 28 is logically associated, or concerning other subject matter possibly unrelated to page 28.

In one embodiment, as for rating scale 60 of tool 32, each rating scale 72 includes five levels ranging from very negative to very positive, each level having an associated language-independent or other suitable symbol 74. For example only, a "−−" symbol 74 might correspond to a very negative rating, a "−" symbol 74 might correspond to a somewhat negative rating, a "+−" symbol 74 might correspond to a neutral rating, a "+" symbol 74 may correspond to a somewhat positive rating, and a "++" symbol 74 may correspond to a very positive rating. Although five level rating scales 72 are described, any suitable multi-level or other subjective rating scale or scheme may be employed without departing from the intended scope of the present disclosure. Each rating scale 72 of tool 34 may be substantially the same or may be differentiated from other rating scales 72 on one or more bases, for example, through the use of color, shading, shape, or other characteristic. Preferably, rating scales 72 are substantially similar to or otherwise consistent with rating scale 60 to maintain predictability, consistency, and acceptance within the user community.

To record specific feedback concerning page 28, the user 16 clicks on, points to, or otherwise selects an appropriate symbol 74 reflective of the feedback. In response, tool 34 (or tool 30) may store corresponding user feedback information and cause the user feedback information to be communicated to server 18 for storage in database 36. In a particular embodiment, the feedback information collected in response to user 16 providing specific feedback concerning page 28 may include, in any combination and without limitation: (1) the title of page 28; (2) the URL for page 28; (3) the feedback user identifier; (4) the subjective ratings (for example only, "++," "+," "+−," "−," or "−−"); (5) the time and date the page 28 was accessed; (6) the time and date the subjective ratings were received; (7) web profile information for user 16; and (8) any other appropriate information. According to the demographic user identifier, if one is available at server 18, the demographic information for user 16 may be stored in association with the user feedback information in database 36, as described above. Tool 34 may require multiple ratings to be provided, one for each rating scale 72, before such information is stored.

One or more rating scales 72 may appear substantially simultaneously, in a suitable sequence, or in any other relative manner. For example, a succeeding rating scale 72 might appear only in response to a user 16 providing specific user feedback using a preceding rating scale 72. Whether the succeeding rating scale 72 appears at all might depend on the nature of the specific feedback provided using the preceding rating scale 72. One or more child rating scales 72 may be nested with respect to a parent rating scale 72 on which child rating scales 72 depend within a hierarchy. One or more rating scales 72 may appear instead of or in addition to rating scale 60 and may appear before, substantially simultaneous with, or after rating scale 60. For example, one or more rating scales 72 might appear only in response to user 16 providing general feedback using rating scale 60, or the rating scale 60 might appear only in response to user 16 providing specific feedback using one or more rating scales 72. Other suitable alternatives may be envisioned and the present disclosure is intended to encompass all such alternatives. In a particular embodiment, the rating scales 72 may rotate in their respective positions each time they appear to reduce or eliminate any response bias that might otherwise manifest itself as a result of the arrangement of rating scales 72.

Some or all of the stored information concerning page 28 may be provided to owner 12 in the form of one or more suitable reports to allow owner 12 to assess the success of the particular page 28 in the eyes of the user community. As described more fully above with reference to FIG. 1, icon 50 may cease to be viewable in browser window 52 after specific feedback concerning page 28 has been received from user 16. Although in one embodiment only tool 34 (not tool 32) is visible on the page 28 in response to selection of tool 30, the present disclosure contemplates tool 32 being visible on page 28 instead of or in addition to tool 34.

In one embodiment, as described above, a question mark or other symbol 64 may be associated with the set 70 of rating scales 72 to allow the user 16 to provide comments relating to the page 28, one or more specified aspects of page 28, one or more items associated with page 28, or other appropriate comments. Symbol 64 might further allow user 16 to receive help or other information relating to tool 30, tool 32, tool 34, or system 10. For example, a window similar to the window 65 of FIG. 4 may appear with rating scales 72 in response to user 16 selecting symbol 64. Alternatively, rating scales 72 incorporating such a window might appear in response to user 16 initially selecting icon 50, without requiring user 16 to first select symbol 64. Moreover, as illustrated in FIG. 6, a pop-up window 78 containing rating scale 60 associated with tool 32, one or more rating scales 72 associated with tool 34, and a field 79 to receive comments or help requests might be presented to user 16 in response to user 16 selecting symbol 64, selecting icon 50, or otherwise. The present disclosure contemplates any technique for receiving comments or other textual input from user 16 in association with a particular page 28.

Comments from users 16 regarding a page 28 may be of greater use to an owner 12 when ratings of the page 28 are provided by users 16 in connection with the comments. Such ratings may allow owner 16 to more readily prioritize, categorize, or otherwise manipulate such comments from users 16. In particular embodiments, a user 16 may be encouraged or even required to provide one or more ratings of a page 28 when user 16 provides one or more comments regarding page 28. A required rating may include a rating reflecting a general reaction of user 16 to page 28, a rating reflecting a reaction of user 16 to a specified aspect (such as, for example, content, design, or usability) of page 28, or any other suitable rating. User 16 may be required to provide one or more ratings of page 28 in any suitable manner. For example, when user 16 attempts to submit a comment regarding page 28, one or more rating scales may be presented to user 16 soliciting one or more ratings of page 28 from user 16 in connection with the comment. If user 16 does not provide one or more solicited ratings, user 16 may be prevented from submitting the comment.

Comments from users 16 regarding a page 28 may also be of greater use to an owner 12 when background data is obtained from users 16 in connection with the comments. Such data may include data reflecting hardware, software, or other details concerning a computer system of a user 16. For example only and not by way of limitation, certain background data may reflect the operating system of the computer system, the screen resolution of the computer system, a browser of the computer system, or any other aspects of the computer system. In addition or as an alternative, background data may include data reflecting time spent by a user 16 on a page 28, a referring page 28 (which may include a page 28 that user 16 accessed immediately before accessing a current page 28), or other details concerning a web session of a user 16. In addition or as an alternative, background data may include data reflecting a user identifier that may identify user 16, the computer system of user 16, or both and may be used to track feedback of user 16 over time. Where a comment is used to communicate one or more technical problems user 16 is experiencing with page 28, background data obtained from user 16 in connection with the comment may facilitate identification of the problem by an owner 12 and possibly one or more solutions to the problem. Although a particular use of background data is described, the present disclosure contemplates background data being used in any suitable manner for any suitable purpose.

Background data from users 16 may be obtained in any suitable manner. In particular embodiments, such data may be obtained automatically from a computer system of user 16. For example, tool 30 may obtain background data from one or more components of the computer system when user 16 accesses a page 28. In addition or as an alternative to obtaining background data automatically from a computer system of user 16, background data may be directly solicited from user 16. As an example, window 78 may ask user 16 one or more questions regarding appropriate background data and request user 16 to provide answers to the questions in field 79 along with one or more comments, select from a number of possible answers to the questions in one or more pull-down menus, select from a number of boxes that each correspond to a possible answer to one or more of the questions, or provide answers to the questions in any other suitable manner.

FIG. 7 illustrates an example registration page 80 that may be sent to user 16 in response to user 16 providing general or specific feedback concerning at least one page 28 of a website 26. Alternatively, user 16 may select a hypertext or other link within or associated with icon 50, rating scale 60, ratings scales 72, or window 78. The registration page 80 includes one or more suitable input fields 82 for receiving demographic information from user 16, which is then used to create a user profile for user 16 that is stored in database 40. In one embodiment, demographic information collected from user 16 may include, for example only and not by way of limitation, in any suitable combination: (1) a name; (2) an e-mail or other electronic address; (3) a residence, business, or other physical address; (4) a password; (5) a gender; (6) an age or age range; (7) a job title, position, profession, industry, or other employment information; (8) an employment status (for example, full-time, part-time, student, or retired); (9) number of persons in household; (10) a housing status (for example, homeowner or renter); (11) a highest level of education; (12) personal or household income or income range; (13) information concerning one or more activities of user 16, such as computer usage patterns and preferences; and (14) any other appropriate demographic information.

In one embodiment, as described above with reference to FIG. 1, after server 18 receives demographic information sufficient to establish a user profile for user 16, server 14 assigns a demographic user identifier to the user 16 and associates this demographic user identifier with the corresponding user profile in database 36. The demographic user identifier is stored on the user's computer system (in the form of a cookie, token, or other message) in response to the user 16 providing requested demographic information. In response to user 16 subsequently selecting tool 30 to provide feedback, tool 30 recognizes user 16 according to the stored demographic user identifier and may convey a suitable message to indicate this recognition. For example, the tool 30 may replace the icon 50 with a personalized message (such as "Thanks, [name]") in response to user 16 providing general or specific feedback concerning a particular page 28. This message may be transient, disappearing after a specified time period, or may remain viewable in browser window 52 while the user 16 remains on the page 28. The demographic user identifier preferably matches the feedback user identifier for the user 16, which allows feedback information and demographic information to be readily associated with one another at server 18. As described above, demographic information linked to feedback information may also facilitate the correlation of feedback information to other suitable metrics that are linked to demographic information.

As discussed above, website 26 may have a "topography" according to pages 28 of website 26 and the relationships between the pages 28. In one embodiment, system 10 provides owner 12 with the ability to access and readily navigate through reports, which provide rating information for pages 28 of website 26, in a similar manner as user 16 accesses pages 28 while navigating through website 26 according to the topography of website 26. Furthermore, the reports allow owner 12 to readily focus on pages 28 that are of most interest. For example only, and not by way of limitation, owner 12 may be particularly interested in accessing feedback information for any pages 28 that generated a significant percentage of very negative feedback, whether the feedback is general or specific. As another example, owner 12 may be particularly interested in reviewing feedback information for any pages 28 that generated a significant percentage of very positive feedback from users 16 having specified demographic characteristics. The information is communicated to owner 12 from server 14, upon request, in the form of one or more suitable reports. Upon obtaining this information, which was unavailable using previous techniques, owner 12 may respond to improve website 26 and, quite possibly, the success of an associated business or other enterprise.

Figure 8A:
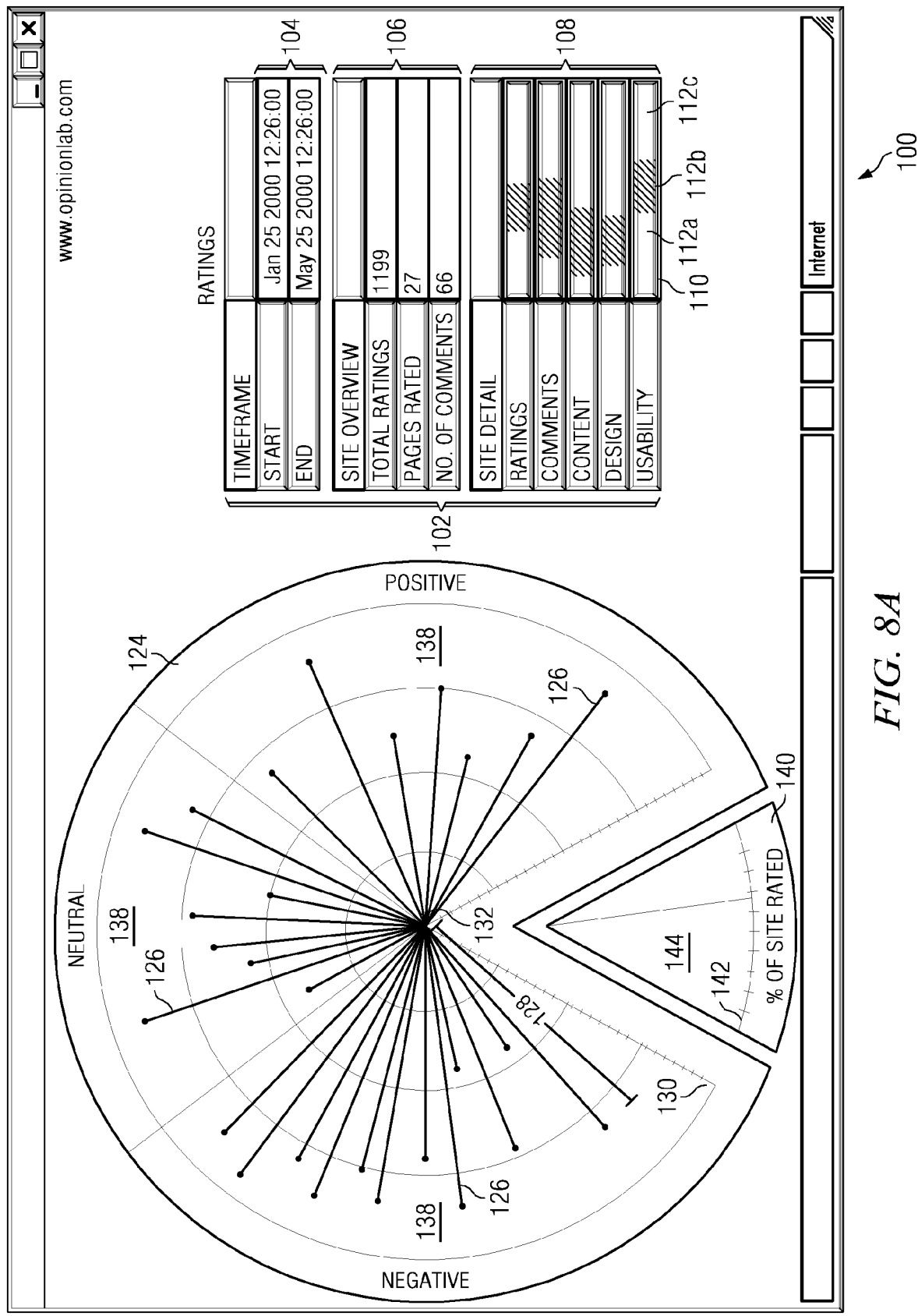
FIGS. 8A and 8B illustrate example site level reports.
Figure 8B:
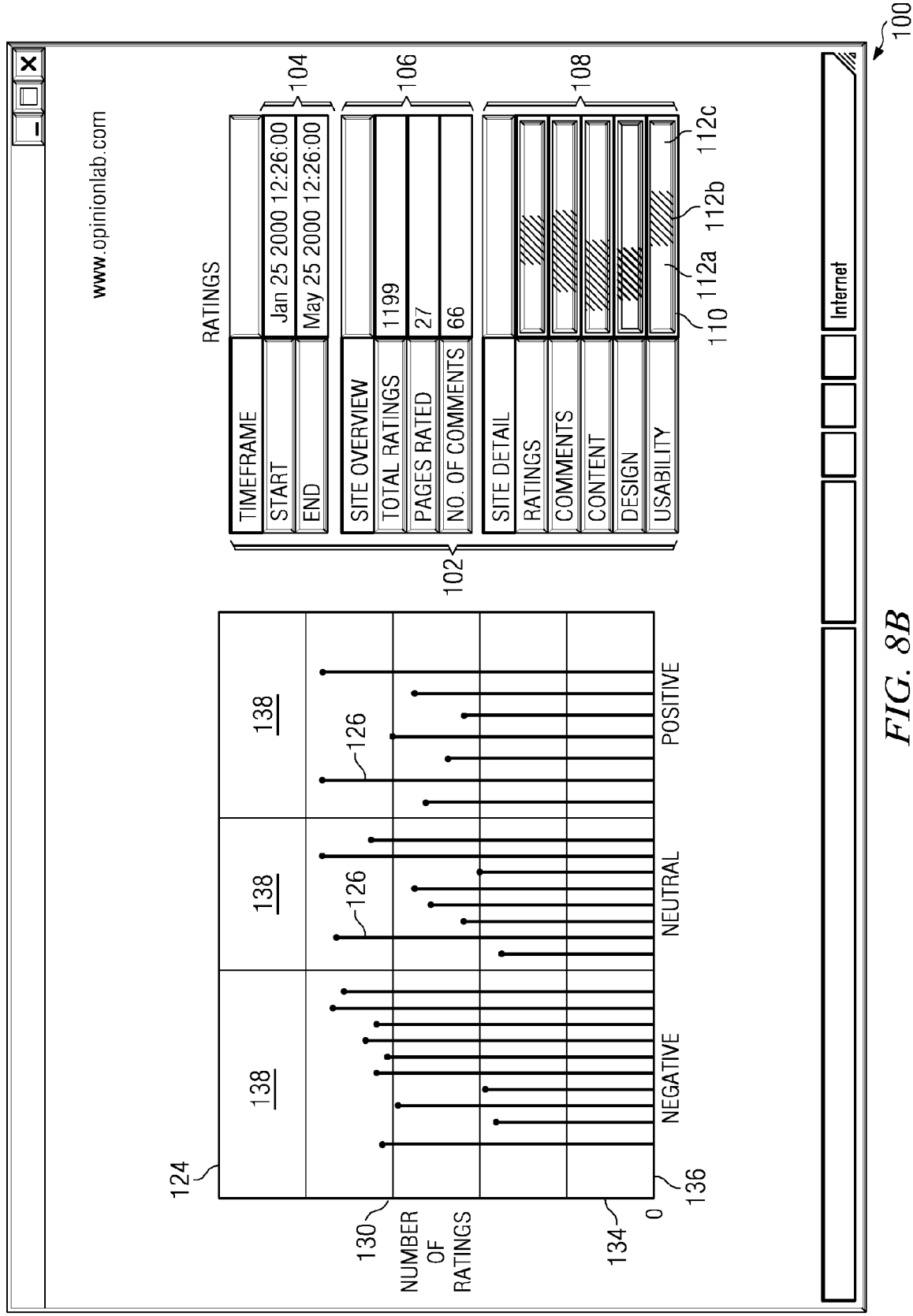
Figure 9:
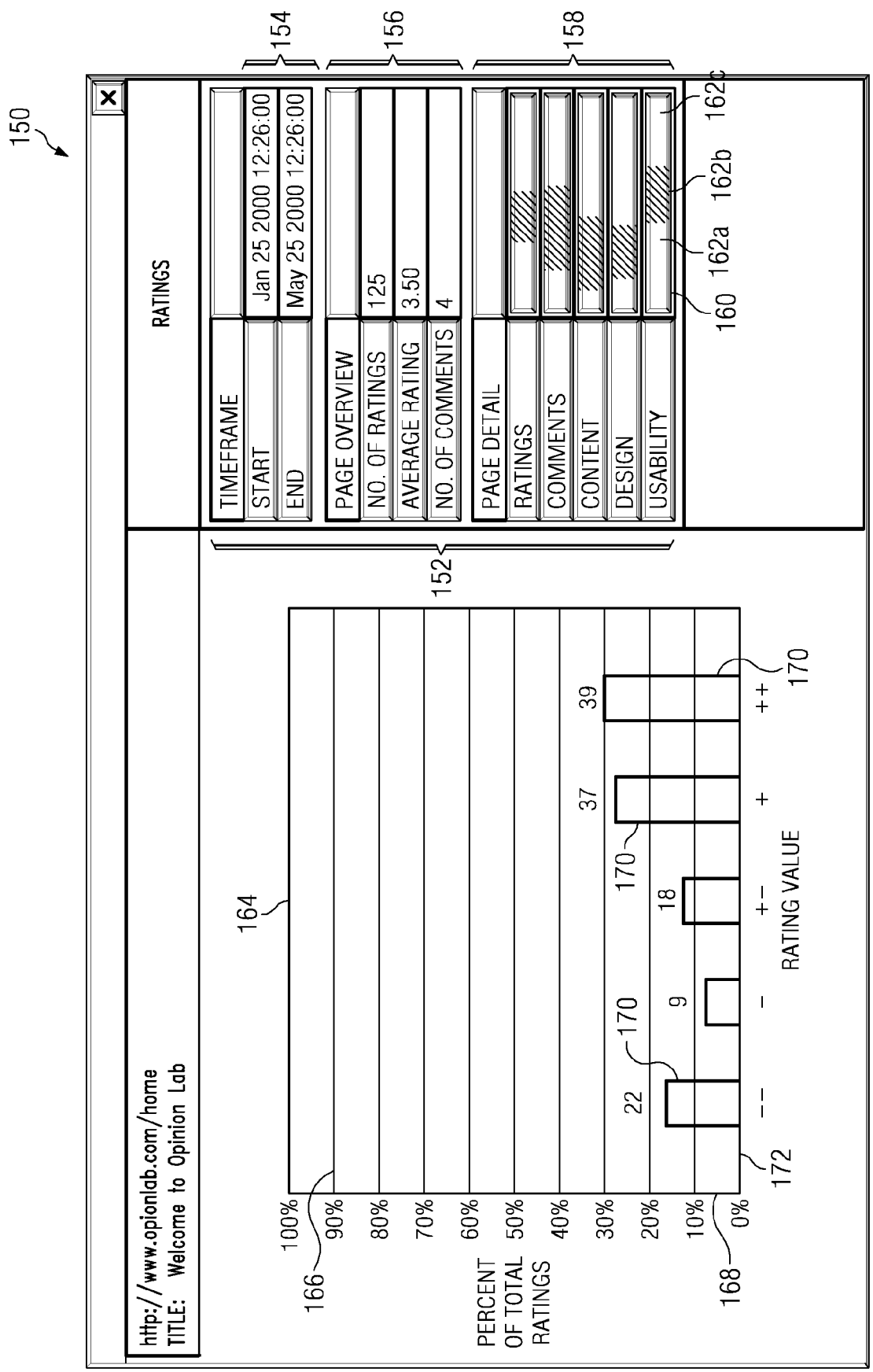
FIG. 9 illustrates an example page level report.

FIGS. 8 through 9 illustrate example reports 100 for one or more pages 28 of website 26. Reports 100 are intended to provide the owner 12 with a readily understandable view of feedback concerning a particular page 28, a set of particular pages 28, or website 26 as a whole (considering all pages 28). As described above, feedback concerning page 28 may include responses to one or more explicit questions about page 28, one or more elements of page 28, one or more items with which page 28 is logically associated, or any other suitable subject. Reports 100 may reflect only feedback collected during a specified time period or might reflect all feedback collected since tool 30 was incorporated into the particular page 28 or pages 28 that reports 100 concern. As an example, reports 100 for successive time periods might allow owner 12 to identify trends in the feedback information and to respond appropriately. Reports 100 may reflect only feedback collected from users 16 having a specified user profile or one or more specified demographic characteristics, or may reflect all feedback collected for the particular page 28 or pages 28 of interest. The present disclosure contemplates one or more reports 100 to provide the owner 12 with any information collected using tools 30, 32, or 34, in a format appropriate for owner 12.

In one embodiment, owner 12 may request that one or more particular reports including particular data be communicated to one or more particular e-mail addresses or other suitable locations at particular times. This may provide one or more advantages where owner 12 includes an organization including a number of different people having different responsibilities within the organization. For example, a person within the organization may be responsible for one or more pages 28 of a website 26 of owner 12. Owner 12 may request that a report including data reflecting user feedback concerning the pages 28 for which the person is responsible be communicated to an e-mail address of the person every at specified time intervals (e.g., three hours), after receiving feedback from a specified number of users 16 (e.g. one hundred), or according to other suitable contact criteria. In addition, owner 12 may request that such reports include data that reflects only negative ratings of pages 28, comments containing one or more specified words, or any other subset of the data.

Reports 100 may be filtered according to any suitable filter criteria such that they include data reflecting particular user feedback. For example only and not by way of limitation, an owner 12 may request that one or more reports communicated to owner 12 include only data reflecting negative ratings. As another example, an owner 12 may request that one or more reports communicated to owner 12 include only data reflecting user feedback for the twenty pages 28 of a website 26 receiving the most negative feedback according to average ratings received from users regarding pages 28. Although particular filter criteria are described, any suitable filter criteria may be used to filter reports 100.

As shown in FIG. 8A for a website 26 as a whole, ratings table 102 may include a timeframe 104 during which the feedback of ratings table 102 was collected. A website overview 106 might include, in any combination and without limitation: (1) the number of ratings for all pages 28 of website 26 (generally or as to one or more specific aspects); (2) the number of one or more specified types of ratings for all pages 28, such as the number of negative ratings (generally or as to one or more specific aspects); (3) the number of unrated pages 28 among all pages 28 (where user 16 accessed page 28 incorporating tool 30 but did not provide a rating); (4) the number of positively rated pages 28 (generally or as to one or more specific aspects) among all the pages 28 (which might include, for example, both positive ratings and very positive ratings according to rating scale 60 or 72 described above); (5) the number of neutrally rated pages 28 (generally or as to one or more specific aspects) among all of the pages 28; (6) the number of negatively rated pages 28 (generally or as to one or more specific aspects) among all pages 28 (which may include, for example, both negative ratings and very negative ratings according to rating scale 60 or 72); (7) the number of ratings for the page 28 with the most ratings or most ratings of a specified type, such as the most negative ratings (generally or as to one or more specific aspects); (8) the number of comments received in connection with all pages 28; (9) and any other suitable rating information concerning website 26, considering all the pages 28. In the alternative, the ratings table 102 might provide similar information concerning one or more particular pages 28.

In one embodiment, a site detail 108 may provide any of the site level rating information described above in a more visually appealing and readily interpretable manner. The site detail 108 may provide a "sliding" or other appropriate scale 110 indicating, for a selected category of site level rating information, the percentages of ratings that are negative, neutral, and positive. For example, the site detail 108 may include a sliding scale 110 for a "usability" aspect of pages 28. Sliding scale 110 might include a first portion 112a indicating the percentage of negative ratings as to usability, a second portion 112b indicating the percentage of neutral ratings as to usability, and a third portion 112c indicating the percentage of positive ratings as to usability. More or fewer portions 112 that reflect finer or coarser rating variations may be provided according to particular needs. Portions 112 may be differentiated from one another using color, shading, or other suitable indicia. For example only, first portion 112a may be red, second portion 112b may be black, and third portion 112c may be green. The present disclosure contemplates providing site level rating information to owner 12 in any suitable format.

In one embodiment, as shown in FIG. 8A, report 100 reflects feedback information for website 26 using a chart 124 having a ray, arrow, bar, or other line 126 for each page 28 of website 26. The lengths 128 of lines 126 along scale 130 represent the total number of ratings received for the corresponding pages 28. Chart 124 may be substantially circular at least in part, as illustrated, with lines 126 that extend outward from its center 132, or may have any other suitable shape. As an example, as illustrated in FIG. 8B, chart 124 may include a "flat" version of chart 124 having a scale 130 in the direction of a first axis 134 and lines 126 extending in the direction of the first axis 134 from a second axis 136 that is perpendicular to the first axis 134. Those skilled in the art will readily appreciate that other suitable schemes for representing the ratings associated with a particular page 28, including color for example, may be used without departing from the intended scope of the present disclosure. In one embodiment, when a mouse pointer is rolled across the tip of line 126 or line 126 is otherwise selected, the title of, the URL for, a link to, a report concerning, or other information relating to corresponding page 28 appears instead of, on top of, near, or otherwise in association with line 126. If a report for page 28 is generated, the report may replace report 100, similar to the manner in which a newly accessed page 28 may replace a previously accessed page 28 within a user's browser window.

In one embodiment, referring again to FIG. 8A, chart 124 may include a number of regions 138, as an example, negative region 138, neutral region 138, and positive region 138. The position of line 126 relative to regions 138 may reflect the average rating for associated page 28 (or other mathematical operation on ratings for associated page 28). For example only and without limitation, if the ratings on five level rating scale 60 are assigned values of "1" through "5" with "1" being for a very negative rating, the average value for page 28 might be "2.5" and the corresponding line 126 might be positioned near the border between negative and neutral regions 138. Regions 138 may each have the same or no color, each region 138 may have a different color, or the colors of regions 138 may transition smoothly across regions 138. Instead of or in addition to colored regions 138, lines 126 may be colored according to their positions relative to regions 138. For example only and without limitation, line 26 reflecting an average rating of "1.4" might be substantially red, a line 26 reflecting an average rating of "3.3" might be substantially black, and line 26 reflecting an average rating of "4.2" might be substantially green. Color may be used in any suitable manner to convey feedback information for one or more pages 28 of website 26.

According to the above, if multiple pages 28 have the same average rating, their lines 126 will overlap on chart 124. To avoid confusion in such cases, shorter lines 126 in such a group (having fewer ratings) may terminate in a white circle rather than a colored circle or may be differentiated in any other suitable manner from the longest line 126 in the group (having the most ratings) and from each other. Such a differentiator may also be desirable where lines 126 do not have the same average rating, and thus do not precisely overlap, but have ratings similar enough to make lines 126 difficult to distinguish from one another. In one embodiment, pages 28 having a substantially neutral average rating but bimodal distributions (according to any suitable formula) may be represented using lines 126 that terminate in a red circle rather than a black circle or are differentiated in another suitable manner from any other lines 126 that reflect substantially neutral average ratings. For any subjective rating described above, the present disclosure contemplates the rating being according to rating scale 60, one or more rating scales 72, or any other appropriate rating scale. Ratings for one scale, scale 60 for example, may be distinguished from ratings for another scale, scale 72 for example, using any suitable visual indicator in the same or a different chart 124, according to particular needs.

As discussed, instead of or in addition to reflecting feedback information for one or more particular pages 28 of website 26, chart 124 may reflect feedback information for website 26 as a whole using a single line 126 that takes into account all pages 28 of website 26. For example, and not by way of limitation, chart 124 may include colored regions 138 as described above and a single line 126 having a length reflecting the number of ratings for all the pages 28 of website 26, according to scale 130, and having a position reflecting the average value of ratings for all pages 28 of website 26. Such a line 126 for website 26 as a whole may be superimposed on chart 124 having lines 126 for particular pages 28 of website 26, may be within a separate window of chart 124, or may have any other suitable spatial relationship to chart 124 having lines 126 for particular pages 28 of website 26. Furthermore, such lines 126 may be used to represent the average rating value for multiple websites 26 on the same chart 100, for example, some or all websites 26 associated with a particular owner 12. Websites 26 for which chart 100 reflects average rating values may be selected according to their owners 12, the industries with which the websites 26 are associated, or other suitable selection criteria.

Benchmarks may be established and reflected in report 100, along with the average rating values for one or more websites 26, for purposes of comparison. For example, as discussed above, report 100 may reflect an overall rating for website 26 according to the average (or other mathematical operation) of ratings for pages 28 of website 26. Overall ratings for other websites 26 that are associated with the same industry or otherwise comparable with the particular website 26 may be generated in an analogous manner. Comparing the overall rating for the particular website 26 with the overall ratings of other websites 26, singly or as a group, may provide valuable information to owner 12. Furthermore, overall ratings for multiple websites 26 may be evaluated in some manner to generate a website index value for each website 26 relative to other comparable websites 26. In one embodiment, such a website index might be updated once a month or otherwise to allow owner 12 to readily track the overall performance of website 26 relative to its peers. An overall rating assigned to website 26 in the manner described above, according to subjective ratings for pages 28 of the website 26, may provide owner 12 with more meaningful information about the effectiveness of website 26 than collecting subjective ratings that each concern only website 26 as a whole.

In one embodiment, report 100 may also include a chart 140, integral to or separate from chart 124, providing a percentage or other relative portion of pages 28 of website 26 that have been rated. For example, and without limitation, if chart 124 is substantially circular as illustrated in FIG. 8A, chart 140 may be located in a sector of chart 124 to allow the owner 12 to appreciate the information in charts 124 and 138 substantially simultaneously. The percentage of other relative portion of rated pages 28 may be indicated using a scale 142 or according to the amount 144 of the chart 140 that is colored, filled, or otherwise indicated as corresponding to that percentage or other relative portion. Providing site level rating information to the owner 12 in an integrated and readily understandable manner using report 100 is an important technical advantage of particular embodiments.

FIG. 9 illustrates an example report 150 for a particular page 28 of website 26. Similar to report 100 for website 26 as a whole, report 100 for page 28 may include ratings table 152 having a timeframe 154 during which the feedback of ratings table 152 was collected. A page overview 156 may include, in any suitable combination and without limitation: (1) the number of ratings for page 28 (generally or as to one or more specific aspects); (2) the number of one or more specified types of ratings for page 28, such as the number of negative ratings (generally or as to one or more specific aspects); (3) the number of positive ratings for page 28 (generally or as to one or more specific aspects), which may include both positive ratings and very positive ratings according to rating scale 60 or 72; (4) the number of neutral ratings for the page 28 (generally or as to one or more specific aspects); (5) the number of negative ratings for page 28 (generally or as to one or more specific aspects), which may include both negative ratings and very negative ratings according to rating scale 60 or 72; (6) the number of comments received in connection with page 28; (7) and any other suitable rating information concerning page 28.

In one embodiment, page detail 158 may provide any of the page level rating information described above in a more visually appealing and readily interpretable manner. The page detail 158 may provide a "sliding" or other appropriate scale 160 indicating, for a selected category of page level rating information, the percentages of ratings that are negative, neutral, and positive. For example, the page detail 158 may include a sliding scale 160 for the "usability"aspect of page 28. Sliding scale 160 may include a first portion 162a indicating the percentage of negative ratings as to usability, a second portion 162b indicating the percentage of neutral ratings as to usability, and a third portion 162c indicating the percentage of positive ratings as to usability. More or fewer portions 162 that reflect finer or coarser rating variations may be provided according to particular needs. Portions 162 may be differentiated from one another using color, shading, or other suitable indicia. For example only, first portion 162a may be red, second portion 162b may be black, and third portion 162c may be green. The present disclosure contemplates providing page level rating information to the owner 12 in any appropriate format.

In one embodiment, report 150 reflects feedback information for page 28 using a chart 164 having a scale 166 in the direction of a first axis 168 and a set of bars, boxes, banners, or other lines 170 extending in the direction of first axis 168 from a second axis 172 that is perpendicular to the first axis 168. The position of a line 170 along second axis 172 reflects the type of rating line 170 represents. The length of line 170 according to scale 166 reflects the number of ratings of that type for page 28. The present disclosure contemplates chart 164 being "flat" as shown, being substantially circular similar to chart 124 shown in FIG. 8A, or having any other suitable configuration. In one embodiment, owner 12 may move from report 100 to any associated report 150 or to another report 100 for another website 26, may move from any report 150 to associated report 100, or may move in any other appropriate manner between reports 100 and 150 in assessing the feedback information for one or more websites 26 and their pages 28.

One or more portions of a report 150 for a page 28 may include hypertext or other suitable links to comments from users 16 regarding page 28. In particular embodiments, for example, a rating line 170 representing a particular rating received from one or more users 16 may include a link to one or more comments regarding page 28 received from users 16 in connection with the particular rating. An owner 12 may select the link, read one or more comments, and attempt to determine one or more reasons for the particular rating. In particular embodiments, as another example, report 150 may include an area in which received comments from users 16 regarding page 28 are tallied and grouped according to ratings received from users 16 in connection with the comments. Such an area may include one or more links to the comments.

As described above, background data may be obtained from users 16 in connection with comments from users 16. Such data may also be presented to owner 12 in any suitable manner. For example, when owner 12 accesses a comment from a user 16 regarding a page 28, background data obtained from user 16 may be presented to owner 12 with the comment independent of owner 12 making a specific request for such data.

In particular embodiments, a report 150 may include one or more counts of one or more words, which may be specified by an owner 12, appearing in one more comments from users 16 regarding page 28. Report 150 may include one or more hypertext or other suitable links to one or more comments from users regarding page 28 in which the one or more words appear. In addition to a report 150 for particular page 28 including one or more word counts, a report for an entire website 26 may include one or more counts of one or more words, which may be specified by an owner 12, appearing in one or more comments from users 16 regarding one or more pages 28 across website 26. Monitoring the appearance of certain words in comments regarding a particular page 28 or in comments regarding one or more pages 28 across a website 26 in this manner may enable an owner 12 to more readily track, interpret, and respond where appropriate to feedback concerning one or more particular aspects of page 28 or website 26.

A report 150 for a particular page 28 may provide hypertext or other suitable links to reports 150 for other pages 28 that may be linked to the particular page 28 according to the unique topography of website 26. For example, if a first page 28 allows users 16 to access either a second page 28, a third page 28, or a fourth page 28, report 150 for the first page 28 might similarly allow owner 12 to access at least the reports 150 for the second page 28, for the third page 28, and for the fourth page 28. Report 150 for the first page 28 might further allow owner 12 to access the parent page 28 of the first page 28; that is, the page 28 at an adjacent higher level within a hierarchical topography of website 26 from which user 16 might navigate to the first page 28. In one embodiment, reporting module 46 generates reports 150 "on the fly" in response to specific requests received from the owner 12 using network 20. For example, reporting module 46 might access one or more databases 36, 40, and 44 to generate report 150 in response to owner 12 clicking on, pointing to, or otherwise selecting a link to a second page 28 while viewing report 150 for a first page 28. Reporting module 46, through reports 150, allows owner 12 to navigate through feedback information pertaining to the pages 28 of website 26 in much the same manner that users 16 navigate through the pages 28 of website 26 when accessing website 26 for their needs, according to the topography of website 26, providing an important technical advantage.

Instead of or in addition to reports 100 and 150, reports may be provided to owner 12 according to one or more points of view that relate to rating distribution, rating values, rating submission, rating demographics, or other suitable criteria for one or more pages 28. For example, and not by way of limitation, such reports may include: (1) a report of the distribution of ratings (number of ratings for each rating value) for a page 28 overall, for page 28 for a specified demographic profile (such as all women), or for page 28 for a target demographic profile of owner 12 (such as all women over 65 years old that live in Chicago and own their residence); (2) a report ranking, for one or more demographics (such as age), the top one or more categories (such as 18-25 year old) for those demographics in terms of percentage of ratings provided, percentage of ratings provided of a specified type, or any other suitable rating information; (3) a report of the percentage occurrence of each rating value (or one or more selected rating values) for one or more demographics (such as age) or one or more demographic categories (such as 18-25 year old); (4) a report of the number or the percentage of ratings (or ratings of one or more specified types) versus the submission time and date (or time and date range); (5) a report of the distribution of ratings sorted according to the time spent on page 28 before rating submission; (6) a report of the top one or more IP addresses for users 16 submitting ratings for a time and date (or time and date range); and (7) any other suitable report reflecting feedback information, demographic information, and any other collected information, according to particular needs. Although such point of view reports are described as being separate from reports 100 and 150, reports 100 and 150 may convey similar information. In one embodiment, for example, a particular point of view report might resemble report 150 illustrated in FIG. 9.

Figure 10:
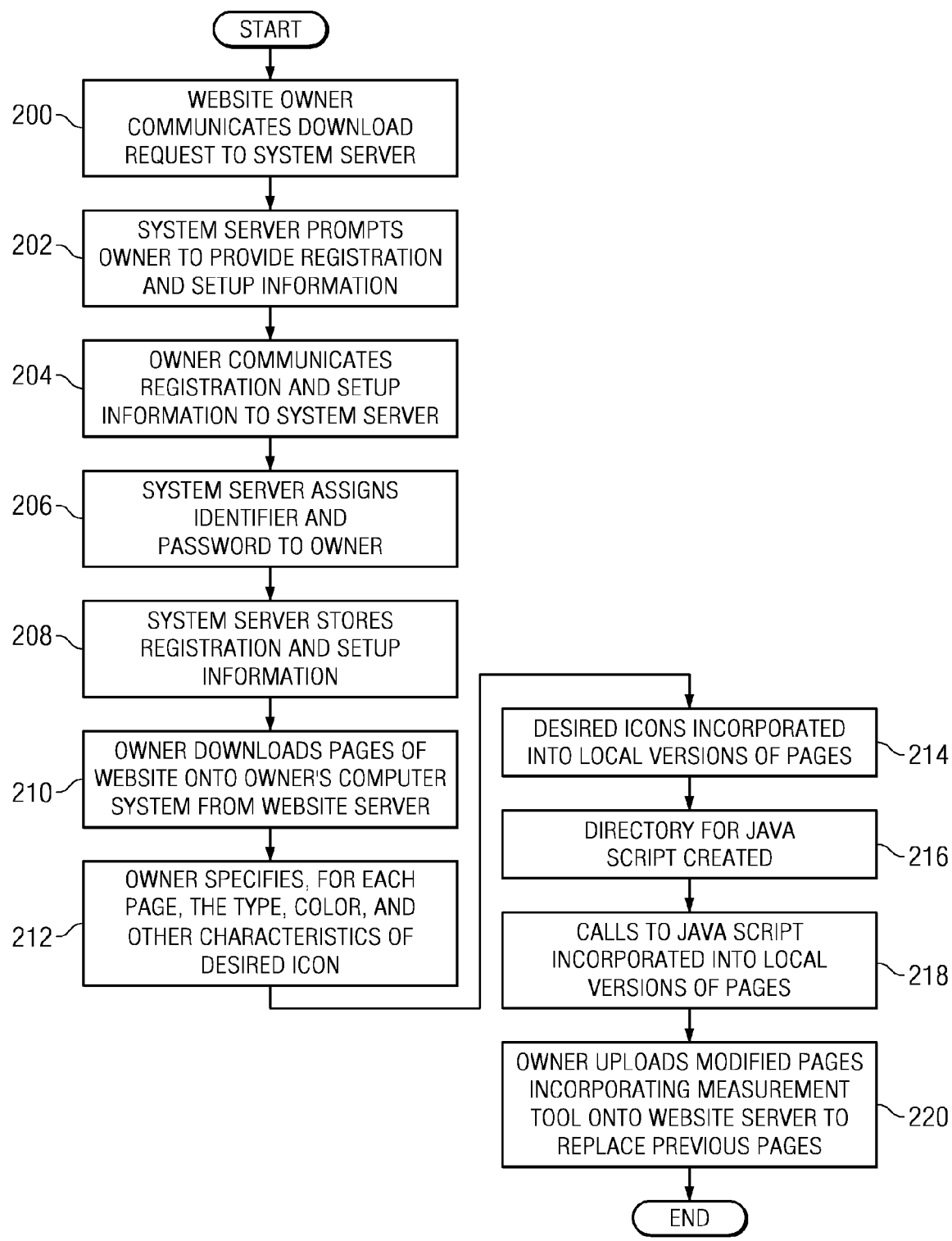
FIG. 10 illustrates an example method of incorporating a user feedback measurement tool into particular web pages of a website.

FIG. 10 illustrates an example method of incorporating tool 30 into one or more particular pages 28 of website 26. The method begins at step 200, where owner 12 communicates a download or other suitable request to server 18 (shown in FIGS. 10 through 12 as "system server 18" to distinguish it from server 14, shown in FIGS. 10 through 12 as "website server 14"). At step 202, server 18 prompts owner 12 to provide identification, billing, and any other suitable registration and setup information. At step 204, owner 12 communicates the requested information to the server 18 (whether or not the server 18 is local to or distributed from owner 12). Server 18 may also notify owner 12 that website 26 may be crawled to identify and gather data pertaining to pages 28, may provide owner 12 with a license agreement and other information concerning the services to be provided to owner 12, or may communicate any other suitable information with owner 12. At step 206, server 18 may assign an owner identifier and password to owner 12 to allow the owner 12 to access reports 100. Server 18 stores the registration and setup information for owner 12 in an appropriate storage location (not explicitly shown) at step 208 to complete registration and setup of owner 12.

At step 210, to incorporate tool 30 into one or more pages 28 of website 26, owner 12 downloads or otherwise communicates pages 28 (or copies of pages 28) from server 14 to the owner's computer system, preferably using a suitable wizard or other software component designed to facilitate the incorporation process. At step 212, owner 12 specifies, for each page 28, the type (for example, spinning between "(+)" and "(−)"), color, or any other appropriate characteristic of the desired icon 50 for page 28. For example and without limitation, the owner 12 may click on desired icon 50, which might be one of multiple standard icons 50, and modify one or more characteristics of icon 50 using suitable pull down menus. As described above, the characteristics of the icon might include one or more explicit questions concerning page 28, concerning one or more visual, audible, or other elements of page 28, or concerning one or more items with which page 28 is logically associated. Desired icons 50 are incorporated into local versions of pages 28 at step 214, singly or as a group. For example and not by way of limitation, owner 12 may click on, drag and drop, or otherwise incorporate desired icons 50 into the local version of pages 28, singly or as a group. Alternatively, the incorporation might occur automatically in response to owner 12 simply specifying characteristics of icon 50.

Owner 12, through the wizard or in any other suitable manner, may create a separate directory containing a JAVA-SCRIPT or other script embodying tool 30 at step 216 and, at step 218, may paste or otherwise incorporate a suitable call to the script into the software code of the local version of page 28. After the tool 30 is incorporated into the local versions of pages 28, owner 12 may use the wizard to upload or otherwise communicate modified pages 28 (now incorporating tool 30) to server 14 at step 220, singly or as a group, to replace corresponding pages 28 (not incorporating tool 30) in website 26. While an particular example embodiment is described in detail, tool 30 may be incorporated into one or more pages 28 of a website 26 in any suitable manner without departing from the intended scope of the present disclosure. For example, as an alternative, server 18 may communicate tool 30 and associated software components directly to server 14 for automatic incorporation into pages 28, in response to a download request from owner 12. After the pages 28 incorporating tool 30 are then uploaded to server 14, the method ends. Tool 30 is communicated with page 28 to user 16 in response to user 16 accessing page 28 during a browser session.

Figure 11A:
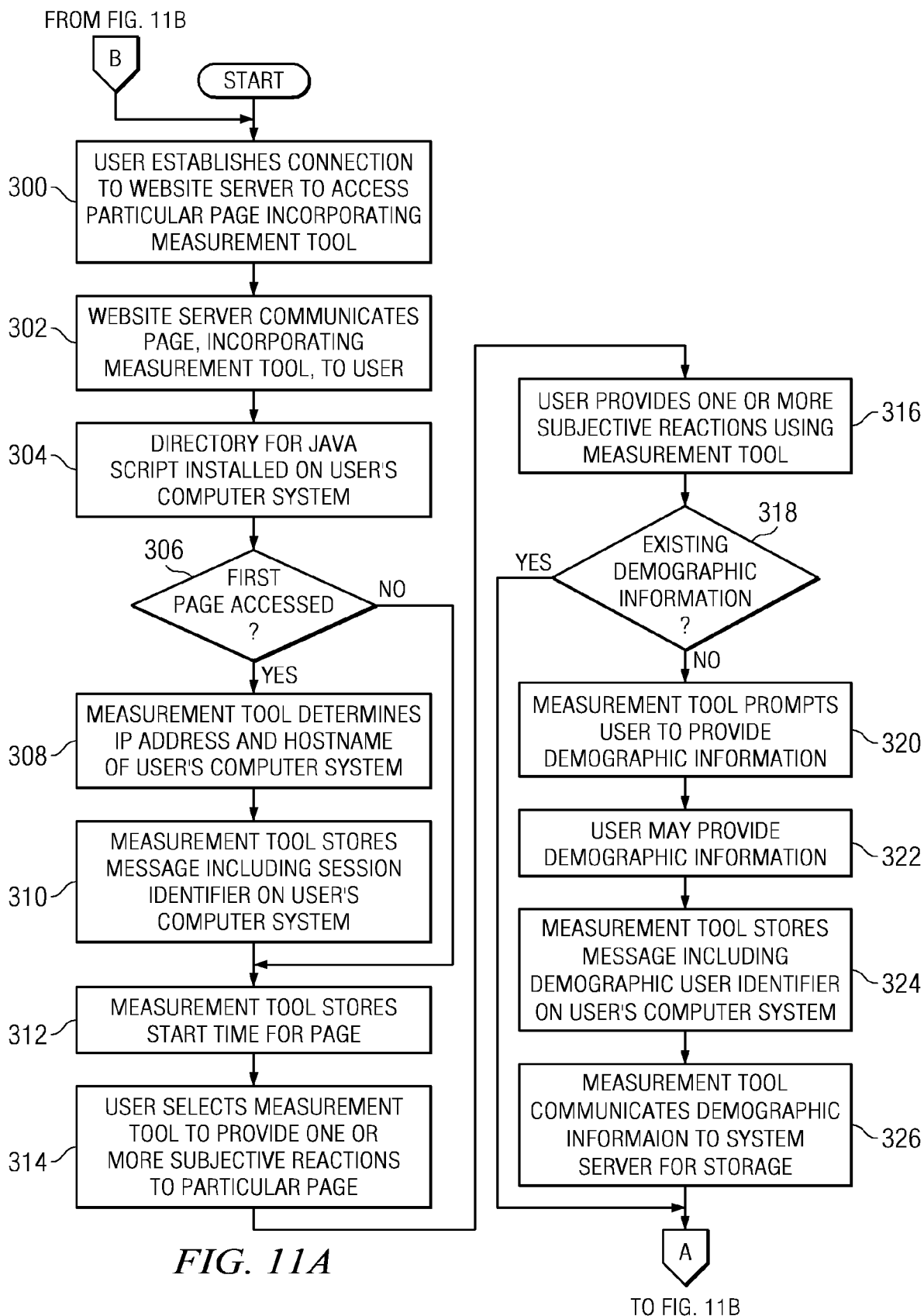

FIG. 11 illustrates an example method of measuring feedback of user 16 to one or more particular pages 28 of website 26. The method begins at step 300, where user 16 establishes a connection to server 14 to access a particular page 28 of website 26 incorporating tool 30. At step 302, server 14 communicates page 28, with incorporated tool 30, to user 16 and, at step 304, a separate directory containing the script associated with tool 30 is installed in some appropriate manner on the user's computer system. If page 28 is the first page 28 incorporating tool 30 that the user 16 has accessed during the browser session at step 306, tool 30 attempts to determine at step 308 the IP or other electronic address for the user's computer system and, when technically feasible, the hostname for the user's computer system. At step 310, the tool 30 attempts to store a cookie, token, or other appropriate message on the user's computer system, through the user's web browser or otherwise, containing the session identifier for the browser session. At step 312, tool 30 may also store the time and date at which user 16 accessed the page 28. At step 306, if page 28 is not the first page 28 incorporating tool 30 that user 16 has accessed during the browser session, the method may proceed directly to step 312. The present disclosure contemplates steps 304 through 312 occurring in any appropriate order, according to particular needs.

At step 314, user 16 rolls an associated mouse pointer over icon 50, points to and clicks on icon 50 using the mouse pointer, touches icon 50 using an associated touch screen, or otherwise selects tool 30 to provide feedback concerning the particular page 28. As described more fully above, a multi-level subjective rating scale 60 associated with tool 32 may request user 16 to provide general feedback concerning page 28, one or more multi-level subjective rating scales 72 associated with tool 34 may request the user 16 to provide specific feedback concerning page 28, rating scale 60 and one or more rating scales 72 may appear in combination to request a combination of general and specific feedback concerning page 28, or feedback concerning page 28 may be requested in any other suitable manner. In one embodiment, as described above, feedback concerning page 28 may include one or more responses to explicit questions posed to user 16 concerning page 28, concerning one or more elements of page 28, or concerning one or more items with which page 28 is logically associated. Such questions may be presented to user 16 instead of or in addition to a rating scale 60 or 72. At step 316, user 16 provides feedback using a suitable combination of tools 30, 32, and 34.

If tool 30 determines at step 318 that user 16 has not previously provided demographic information, based on the absence on the user's computer system of a cookie, token, or other message including a demographic user identifier, the tool 30 may prompt user 16 to provide sufficient demographic information using registration page 80 at step 320. If user 16 provides requested demographic information at step 322, tool 30 attempts to store a cookie, token, or other suitable message including a demographic user identifier on the user's computer system at step 324. Tool 30 may communicate the demographic information and demographic user identifier to server 18 at step 326 for storage in database 40. Alternatively, the tool 30 may wait to communicate the demographic information together with feedback information described below. At step 328, tool 30 attempts to store a cookie, token, or other suitable message including a feedback user identifier on the user's computer system, preferably the same as the demographic user identifier described above. If tool 30 determines at step 318 that user 16 previously provided demographic information (in the same or in a previous browser session), based on there being a cookie, token, or other suitable message including a demographic user identifier stored on the user's computer system, the method may proceed directly to step 328. Step 328 may occur before, during, or after steps 318 through 326, as appropriate.

At step 330, tool 30 temporarily stores feedback information on the computer system of user 16 and instructs the computer system to communicate the feedback information to server 18. In one embodiment, the feedback information for page 28 may include, in any suitable combination and without limitation, the title, the URL, the start time and date, the feedback time and date, the feedback, the feedback user identifier, and web profile information. Tool 30 may continue to store the feedback user identifier for determining, in response to the user 16 subsequently accessing the particular page 28, that user 16 has already accessed the particular page 28. Tool 30 communicates feedback information, using the computer system of user 16, to server 18 at step 332. At step 334, tool 30 may cause an icon 50 to become unviewable on the particular page 28 for the remainder of the browser session, until user 16 leaves the page 28 (being viewable again if user 16 returns to the page 28 during the browser session), or for any other suitable period.

At step 336, server 18 manipulates and stores feedback information received from tool 30. For example, server 18 may compute the time spent on the page 28 before user 16 provided the feedback. Server 18 stores any such computed feedback information, together with suitable feedback information received from tool 30, in database 36. If the received feedback information included a feedback user identifier, server 18 may attempt to match the feedback user identifier with a demographic user identifier stored in database 40, to allow the server 18 to associate the demographic information for user 16 with the feedback information in database 36. If user 16 has closed the web browser to terminate the browser session at step 338, the cookies, tokens, or other messages stored on the user's computer system containing the session identifier and feedback user identifier may expire at step 340, and the method ends. If user 16 instead accesses another page 28 that incorporates tool 30 during the browser session, the method returns to step 300.

FIG. 12 illustrates an example method of reporting to owner 12 user feedback concerning one or more particular web pages 28 of a website 26. The method begins at step 400, where collection module 42 may perform a crawl or otherwise identify the pages 28 of website 26 incorporating tool 30. At step 402, collection module 42 may parse pages 28 to identify their titles, URLs, and any other appropriate information. At step 404, the collection module 42 may generate a map or other report concerning the topography of website 26 and, at step 406, store the map in the database 44. At step 408, owner 12 communicates a report request to server 18 and, at step 410, the reporting module 46 prompts owner 12 to specify one or more criteria for use in generating the requested report 100. Owner 12 provides the requested report criteria at step 412.

The report criteria may include, for example and not by way of limitation: (1) whether a ratings table 102 or 152 is to be displayed; (2) the desired information that is to appear in the ratings table 102 or 152; (3) whether a chart 124 or 164 is to be displayed, instead of or in addition to ratings table 102 or 152, respectively; (4) the type of chart 124 or 164 to be displayed (for example, chart 124 of FIG. 8A or chart 124 of FIG. 8B); (5) the desired information to appear in chart 124 or 164; (6) how the desired information is to be displayed in chart 124 or 164 (for example, specifying the use of color for regions 138 and lines 126); (7) whether chart 140 is to be displayed, instead of or in addition to ratings table 102 or chart 124; (8) a point of view for the report 100 or 150 (for example, specifying one or more demographic characteristics to which the report 100 or 150 is to be limited, one or more time periods to which report 100 or 150 is to be limited, or any other suitable points of view); and (9) any other suitable report criteria.

At step 414, reporting module 24 accesses the map for website 26 stored in database 44, feedback information for pages 28 stored in database 36, and possibly demographic information for users 16 stored in database 40. As described above, the demographic information relating to particular feedback information may be stored in association with the feedback information, in database 36 for example, when feedback information is received and processed. As a result, the reporting module 46 may not need to access database 40 to generate report 100 or 150. At step 416, reporting module 46 then generates the requested report 100 or 150, concerning one or more particular pages 28 of website 26, according to the specified report criteria. In one embodiment, reporting module 46 generates report 100 or 150 on the fly in response to the specific report request from owner 12, without having previously stored report 100 or 150. At step 418, the reporting module 46 then communicates the requested report 100 or 150 to owner 12.

If the owner 12 wishes to access another report 100 or 150 at step 420, the method returns to step 412, where the owner 12 provides new report criteria. In a particular embodiment, report 100 or 150 may provide hypertext or other appropriate links that, when selected, cause reporting module 46 to generate a new report 100 or 150 according to the selected link. The present disclosure contemplates owner 12 specifying new report criteria through selection of such a link, in the manner that owner 12 specified the original report criteria, or in any other appropriate manner. Preferably, owner 12 may navigate through at least reports 150 in substantially the same manner that users 16 might navigate through various pages 28 of website 26, according to the topography of website 26. As described above, this feature provides an important technical advantage of particular embodiments. Steps 412 through 420 may be repeated as many times as necessary or desirable to satisfy the needs of the owner 12. If the owner 12 does not wish to access another report 100 or 150 at step 420, the method ends.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A system for reporting to a website owner one or more appearances of a specified word in one or more page-specific open-ended comments concerning one or more particular web pages of a website, the system comprising one or more components collectively operable to:
    receive one or more page-specific open-ended comments concerning one or more particular web pages of a website from users that have accessed the particular web pages;
    identify, in the one or more page-specific open-ended comments concerning the one or more particular web pages of the website, each appearance of the specified word;
    generate a report reflecting the identified appearances of the specified word in the one or more page-specific open-ended comments concerning the one or more particular web pages of the website;
    wherein the components are operable to receive page-specific subjective ratings from the users, each page-specific subjective rating concerning one of the particular web pages as a whole and being associated with one or more page-specific open-ended comments concerning the particular web page;
    the report reflects the page-specific subjective ratings that are associated with the page-specific open-ended comments concerning the one or more particular web pages of the website in which one or more appearances of the specified word are identified.

2. The system of claim 1, wherein the users have been required to provide the page-specific subjective ratings concerning the particular web page as a whole to provide the associated page-specific open-ended comments concerning the particular web page.

3. The system of claim 2, wherein the report reflects an average of the page-specific subjective ratings that are associated with the one or more page-specific open-ended comments concerning the one or more particular web pages of the website in which one or more appearances of the specified word are identified.

4. The system of claim 1, wherein:
    the components are operable to count a number of identified appearances of the specified word in the one or more page-specific open-ended comments concerning the one or more particular web pages of the website; and
    the report indicates the count of the number of identified appearances of the specified word in the one or more page-specific open-ended comments concerning the one or more particular web pages of the website.

5. The system of claim 1, wherein the report reflects each comment in which one or more appearances of the specified word are identified.

6. The system of claim 1, wherein the one or more particular web pages of the website comprise all the web pages of the website.

7. A method, by one or more computing systems, for reporting to a website owner one or more appearances of a specified word in one or more page-specific open-ended comments concerning one or more particular web pages of a website, the method comprising:
    receiving one or more page-specific open-ended comments concerning one or more particular web pages of a website from users that have accessed the particular web pages;

identifying, in the one or more page-specific open-ended comments concerning the one or more particular web pages of the website, each appearance of the specified word;

generating a report reflecting the identified appearances of the specified word in the one or more page-specific open-ended comments concerning the one or more particular web pages of the website;

receiving page-specific subjective ratings from the users, each page-specific subjective rating concerning one of the particular web pages as a whole and being associated with one or more page-specific open-ended comments concerning the particular web page; and wherein the report reflects the page-specific subjective ratings that are associated with the page-specific open-ended comments concerning the one or more particular web pages of the website in which one or more appearances of the specified word are identified.

8. The method of claim 7, wherein the users have been required to provide the page-specific subjective ratings concerning the particular web page as a whole to provide the associated page-specific open-ended comments concerning the particular web page.

9. The method of claim 8, wherein the report reflects an average of the page-specific subjective ratings that are associated with the one or more page-specific open-ended comments concerning the one or more particular web pages of the website in which one or more appearances of the specified word are identified.

10. The method of claim 7, further comprising:

counting a number of identified appearances of the specified word in the one or more page-specific open-ended comments concerning the one or more particular web pages of the website; and wherein the report indicates the count of the number of identified appearances of the specified word in the one or more page-specific open-ended comments concerning the one or more particular web pages of the website.

11. The method of claim 7, wherein the report reflects each comment in which one or more appearances of the specified word are identified.

12. The method of claim 7, wherein the one or more particular web pages of the website comprise all the web pages of the website.

* * * * *